United States Patent
Ulupinar et al.

(10) Patent No.: US 8,406,237 B2
(45) Date of Patent: Mar. 26, 2013

(54) METHODS AND APPARATUS FOR IMPLEMENTING PROXY MOBILE IP IN FOREIGN AGENT CARE-OF ADDRESS MODE

(75) Inventors: Fatih Ulupinar, San Diego, CA (US); Jun Wang, La Jolla, CA (US); Parag Arun Agashe, San Diego, CA (US); Raymond Tah-Sheng Hsu, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1460 days.

(21) Appl. No.: 11/941,873

(22) Filed: Nov. 16, 2007

(65) Prior Publication Data
US 2008/0159227 A1 Jul. 3, 2008

Related U.S. Application Data

(60) Provisional application No. 60/866,402, filed on Nov. 17, 2006, provisional application No. 60/866,582, filed on Nov. 20, 2006, provisional application No. 60/866,823, filed on Nov. 21, 2006.

(51) Int. Cl.
*H04L 12/28* (2006.01)
(52) U.S. Cl. .................................. 370/395.52; 455/433
(58) Field of Classification Search .................. 370/331, 370/395.52; 455/433
See application file for complete search history.

(56) References Cited

U.S. PATENT DOCUMENTS

| 7,139,833 B2 | 11/2006 | Heller |
| 2003/0224788 A1* | 12/2003 | Leung et al. ............... 455/435.1 |
| 2004/0120295 A1* | 6/2004 | Liu et al. ....................... 370/338 |
| 2006/0067354 A1 | 3/2006 | Waltho et al. |
| 2007/0189219 A1* | 8/2007 | Navali et al. ................. 370/331 |
| 2007/0230410 A1* | 10/2007 | Thubert et al. ............... 370/338 |
| 2007/0254661 A1* | 11/2007 | Chowdhury et al. ......... 455/436 |
| 2010/0067503 A1* | 3/2010 | Premec ......................... 370/338 |

FOREIGN PATENT DOCUMENTS

| EP | 1560378 A2 | 8/2005 |
| JP | 2006503501 | 1/2006 |
| JP | 2006222616 A | 8/2006 |

OTHER PUBLICATIONS

International Search Report—PCT/US07/086066, International Search Authority—European Patent Office—May 29, 2008.
Written Opinion- PCT/US07/085066, International Search Authority—European Patent Office—May 29, 2008.
Leung G Dommety P Yegani Cisco Systems K: "Mobility Management using Proxy Mobile Ipv4; draft-leung-mip4-proxy-mode-00.txt" IETF Standard-Working-Draft, Internet Engineering Task Force, IETF, CH, Feb. 26, 2006.
IEEE Network, Vo. 18, Issue: 6, Debashis Saha et al., 2004, Mobility Support in IP: A Survey of Related Protocols, pp. 34-40.
Taiwan Search Report—TW096143797—TIPO—Mar. 27, 2011.

* cited by examiner

*Primary Examiner* — Sai-Ming Chan
(74) *Attorney, Agent, or Firm* — Michael DeHaemer

(57) ABSTRACT

A method for implementing proxy mobile Internet protocol (PMIP) in mobile IP foreign agent care-of-address mode may include determining a home address of an access terminal. The method may also include communicating with a home agent in order to bind an address of the network node with the home address of the access terminal and establish a tunnel between the network node and the home agent. The method may also include receiving first packets destined for the access terminal from the home agent via the tunnel and sending the first packets to the access terminal. The method may also include receiving second packets sent by the access terminal that are destined for a correspondent node and sending the second packets to the home agent via the tunnel.

25 Claims, 17 Drawing Sheets

METHODS AND APPARATUS FOR IMPLEMENTING PROXY MOBILE IP IN FOREIGN AGENT CARE-OF ADDRESS MODE

RELATED APPLICATIONS

This application is related to and claims priority from U.S. Patent Application Ser. No. 60/866,402, filed Nov. 17, 2006, for "A Proxy MIP And Client Based MIPv4 Foreign Agent," with inventors Fatih Ulupinar, Jun Wang, and Parag Agashe, which is incorporated herein by reference.

This application is also related to and claims priority from U.S. Patent Application Ser. No. 60/866,582, filed Nov. 20, 2006, for "A Method And Apparatus For Interaction Between Proxy Mobile IP And Mobile IP Foreign Agent Care-Of Address Mode," with inventors Fatih Ulupinar, Jun Wang, and Parag Agashe, which is incorporated herein by reference.

This application is also related to and claims priority from U.S. Patent Application Ser. No. 60/866,823, filed Nov. 21, 2006, for "A Method And Apparatus For Interaction Between Proxy Mobile IP And Mobile IP Foreign Agent Care-Of Address Mode," with inventors Fatih Ulupinar, Jun Wang, and Parag Agashe, which is incorporated herein by reference.

TECHNICAL FIELD

The present disclosure relates generally to wireless communication systems. More specifically, the present disclosure relates to methods and apparatus for implementing proxy mobile IP in foreign agent care-of address mode.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices. Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

DETAILED DESCRIPTION

Figure 1:
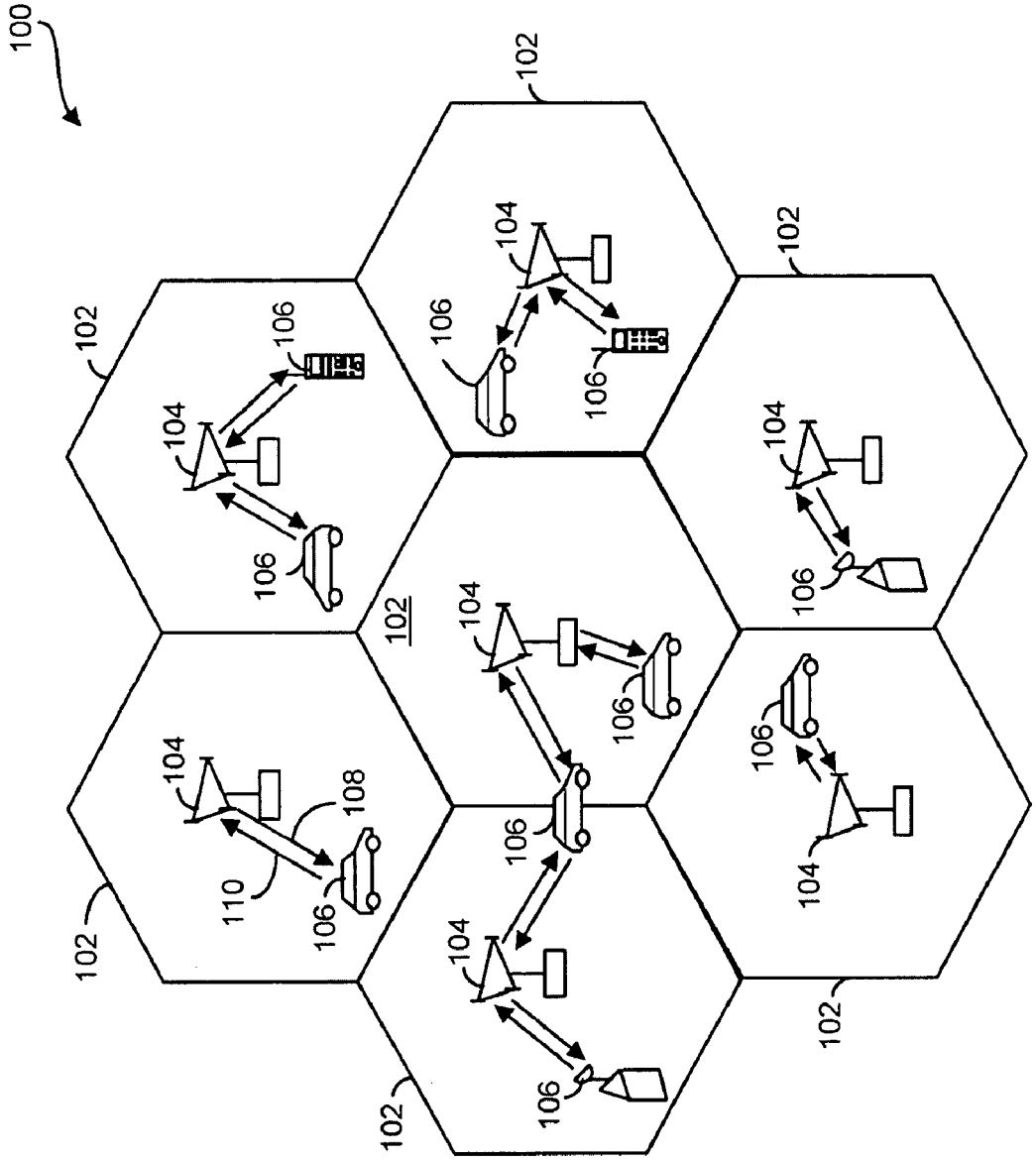
FIG. 1 illustrates an example of a wireless communication system.

FIG. 1 illustrates an example of a wireless communication system 100. The wireless communication system 100 provides communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 shows various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc. A variety of algorithms and methods may be used for transmissions in the wireless communication system 100 between the base stations 104 and the user terminals 106.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

The following acronyms may be used in the present disclosure:
AAA=authentication, authorization, and accounting
AAG=access agnostic gateway (may also be referred to as an access gateway, or AGW)
AT=access terminal
BA=binding acknowledgement
BS=base station
BU=binding update
CCoA=co-located care-of address
CMIP=client-based mobile IP
CoA=care-of address
DHCP=dynamic host configuration protocol eBS=evolved base station
FA=foreign agent
GRE=generic routing encapsulation
HA=home agent
HAAA=home AAA
HoA=home address
IKE=Internet key exchange
IP=Internet protocol
IPsec=IP security
IPv4=Internet protocol version 4
IPv6=Internet protocol version 6
LMHA=local mobility home agent
MIP=mobile IP
MIPv4=mobile IP for IPv4
MIPv6=mobile IP for IPv6
MN=mobile node
MS=mobile station
PDSN=packet data serving node
PMIP=proxy mobile IP
RRP=registration reply
RRQ=registration request
S-eBS=source eBS
T-eBS=target eBS
VAAA=visited AAA Mobile IP is an Internet Engineering Task Force (IETF) standard communications protocol that is designed to allow mobile device users to move from one network to another while maintaining a permanent IP address. Using mobile IP, nodes may change their point-of-attachment to the Internet without changing their IP address. This allows them to maintain transport and higher-layer connections while moving.

Mobile IP defines two addresses for each mobile node (MN). The first address is the home address (HoA), which is the address that is issued to the MN by its home network. The HoA can be thought of as identifying the MN to the IP network. The second address is the care-of address (CoA), which is a temporary IP address that is assigned to the MN by the visited network. This IP address can be thought of as providing information about the current logical location of the MN.

Mobile IP uses two mobility agents, the home agent (HA) and the foreign agent (FA). The HA is located in the home network, and the FA is located in the visited network. The FA may be co-located with the MN. This is referred to as a co-located FA.

Whenever the MN moves away from the home network to a visited network, this movement may be detected through the use of location-discovery protocols. Mobility agents may advertise their presence to enable discovery by the MN. Once in a visited network, the MN may obtain a new address and send an update message to the HA, informing it of the address of the new FA. This update registration may be done directly by the MN for a co-located care-of address (CCoA), or it may be relayed by the FA if the visited subnet FA address is used as the CoA.

Once the HA is updated with the new CoA, packets destined to the MN that arrive in the home network may be forwarded to the appropriate FA CoA by encapsulating them in a tunneling protocol. IP-in-IP encapsulation may be used for this tunneling. Alternatively, minimal encapsulation or generic routing encapsulation (GRE) tunneling may be used. The FA may de-capsulate the packets and deliver them to the MN. By having the HA act as the anchor point for packets that are destined to the MN, mobile IP facilitates the delivery of packets to the MN regardless of its location.

To implement mobile IP, a mobile IP client or MN functionality may be provided in every AT. This is sometimes referred to as client-based mobile IP (CMIP). However, CMIP may not be feasible under some circumstances. One way to address this issue is to have a node in the network that acts as a proxy to the mobile IP client functionality in the AT. This scheme may be referred to as proxy mobile IP (PMIP). The network node that acts as the proxy may perform registration and other MIP signaling on behalf of the MN. Like in the case of CMIP, the network node that acts as the proxy may include a co-located FA functionality or work with an external FA entity.

PMIP may be used when an access terminal (AT) moves from one base station (BS) or packet data serving node (PDSN) to another BS or PDSN without changing CoA/CCoA from the AT's perspective. If PMIP is used, there is no need for the AT to send CMIP RRQ/RRP (BU/BA) over the air. An entity referred to as the local mobility home agent (LMHA) may be introduced for PMIP operation.

PMIP interaction for MIPv6 and MIPv4 CCoA is clean. There is separate binding between the CMIP and the PMIP. In particular, there is binding between the HoA and the CCoA. There is also binding between the CCoA and the IP address of the eBS/PDSN.

However, PMIP interaction for MIPv4 FA CoA mode may be challenging because the FA CoA is the same for all ATs. The present disclosure relates to techniques for implementing PMIP in mobile IP FA CoA mode.

A method for implementing proxy mobile Internet protocol (PMIP) in mobile IP foreign agent care-of-address mode is disclosed. The method may be performed by a network node that is a proxy for mobile IP client functionality in an access terminal. The method may include determining a home address of the access terminal. The method may also include communicating with a home agent in order to bind an address of the network node with the home address of the access terminal and establish a tunnel between the network node and the home agent. The method may also include receiving first packets destined for the access terminal from the home agent via the tunnel and sending the first packets to the access terminal. The method may also include receiving second packets sent by the access terminal that are destined for a correspondent node and sending the second packets to the home agent via the tunnel.

A network node for implementing proxy mobile Internet protocol (PMIP) in mobile IP foreign agent care-of-address mode is also disclosed. The network node includes a processor, memory in electronic communication with the processor, and instructions stored in the memory. The instructions may be executable to determine a home address of the access terminal. The instructions may also be executable to communicate with a home agent in order to bind an address of the network node with the home address of the access terminal and establish a tunnel between the network node and the home agent. The instructions may also be executable to receive first packets destined for the access terminal from the home agent via the tunnel and send the first packets to the access terminal. The instructions may also be executable to receive second packets sent by the access terminal that are destined for a correspondent node and send the second packets to the home agent via the tunnel.

An apparatus for implementing proxy mobile Internet protocol (PMIP) in mobile IP foreign agent care-of-address mode is also disclosed. The apparatus may include means for determining a home address of the access terminal. The apparatus may also include means for communicating with a home agent in order to bind an address of the network node with the home address of the access terminal and establish a tunnel between the network node and the home agent. The apparatus may also include means for receiving first packets destined for the access terminal from the home agent via the tunnel and sending the first packets to the access terminal. The apparatus may also include means for receiving second packets sent by the access terminal that are destined for a correspondent node and sending the second packets to the home agent via the tunnel.

A computer-program product for implementing proxy mobile Internet protocol (PMIP) in mobile IP foreign agent care-of-address mode is also disclosed. The computer-program product includes a computer readable medium having instructions thereon. The instructions may include code for determining a home address of the access terminal. The instructions may also include code for communicating with a home agent in order to bind an address of the network node with the home address of the access terminal and establish a tunnel between the network node and the home agent. The instructions may also include code for receiving first packets destined for the access terminal from the home agent via the tunnel and sending the first packets to the access terminal. The instructions may also include code for receiving second packets sent by the access terminal that are destined for a correspondent node and sending the second packets to the home agent via the tunnel.

Figure 2:
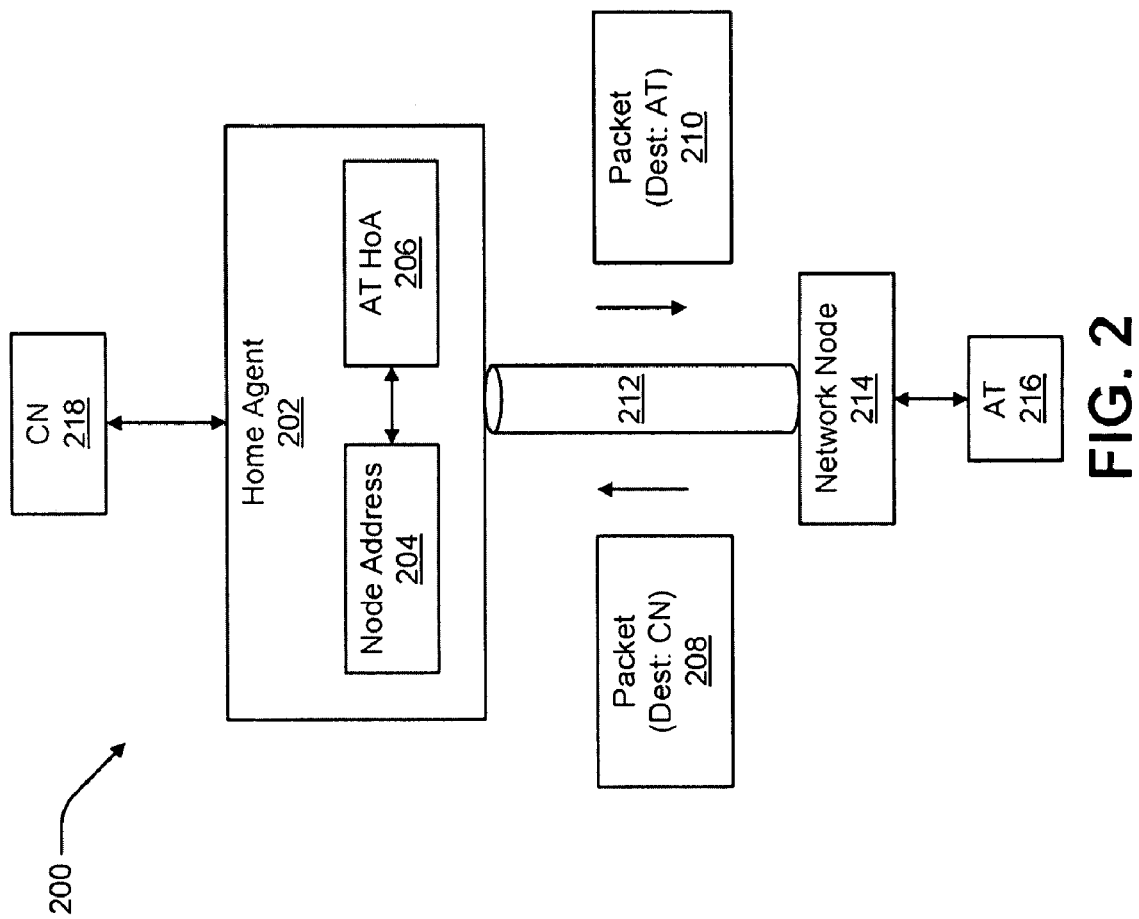
FIG. 2 illustrates a system for implementing PMIP in mobile IP FA CoA mode.

FIG. 2 illustrates a system 200 for implementing PMIP in mobile IP FA CoA mode. The system 200 includes an AT 216 and a network node 214 that is a proxy for mobile IP client functionality in the AT 216. The network node 214 may be a base station (BS), an evolved base station (eBS), a packet data serving node (PDSN), an access gateway (AGW), an access agnostic gateway (AAG), a local mobility home agent (LMHA), etc.

The network node 214 may be configured to determine the HoA 206 of the AT 216. There are many different ways that this may be done. For example, the network node 214 may receive the HoA 206 of the AT 216 from an authentication, authorization, and accounting (AAA) component during authentication. As another example, the network node 214 may receive the HoA 206 of the AT 216 from a home agent 202. As another example, the network node 214 may snoop a registration reply message that is sent from the home agent 202. As another example, the network node 214 may receive the HoA 206 of the AT 216 from the AT 216 itself.

Once the network node 214 has determined the HoA 206 of the AT 216, the network node 214 may communicate with the home agent 202 in order to bind the IP address 204 of the network node 214 with the HoA 206 of the AT 216. A tunnel 212 may be established between the network node 214 and the home agent 202.

Once the tunnel 212 has been established, when the home agent 202 receives packets 210 that are destined for the AT 216, the home agent 202 may send the packets 210 to the network node 214 via the tunnel 212. When the network node 214 receives packets 208 from the AT 216 that are destined for a CN 218, the network node 214 may send the packets 208 to the home agent 202 via the tunnel 212.

Figure 3:
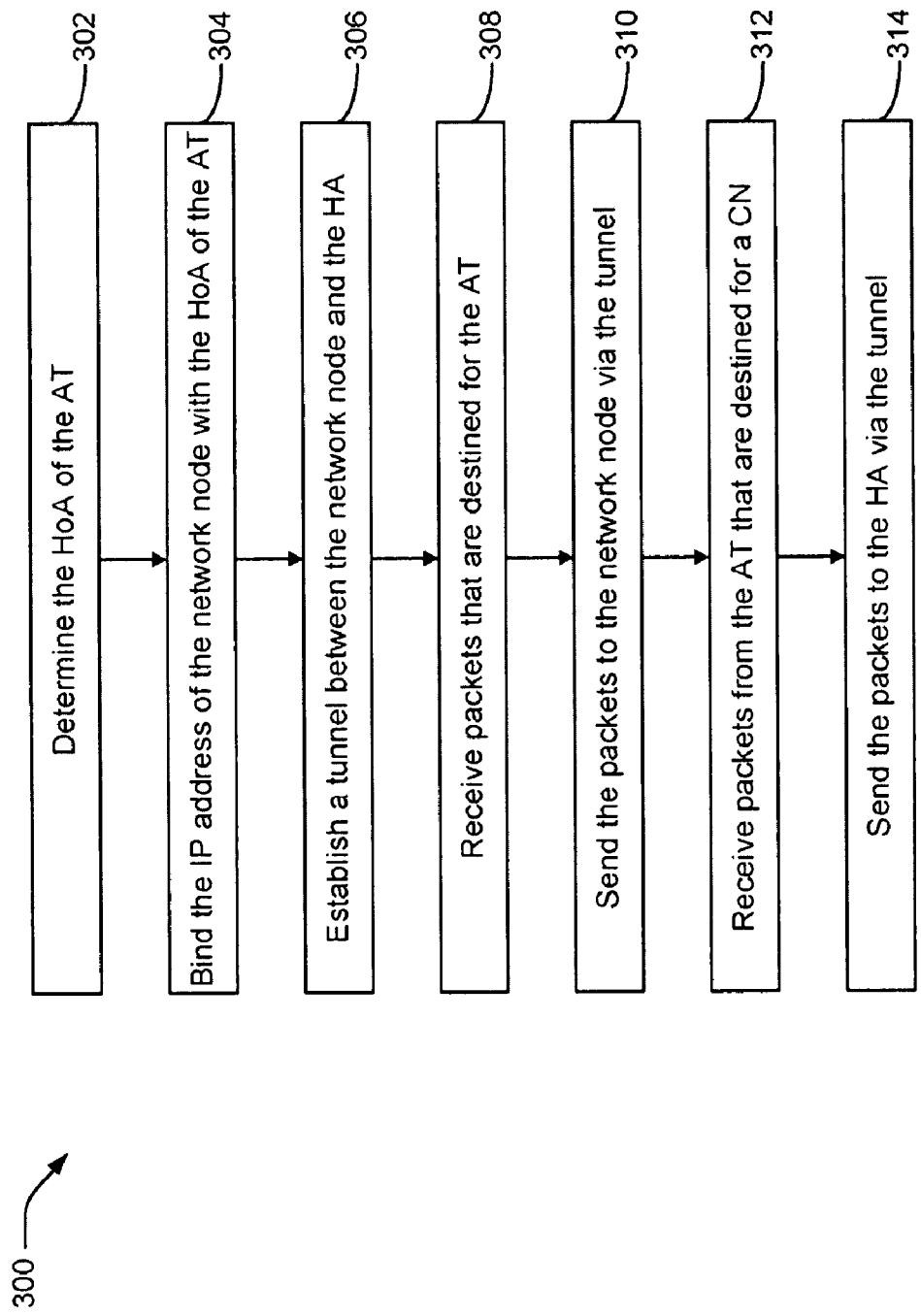
FIG. 3 illustrates a method for implementing PMIP in mobile IP FA CoA mode.

FIG. 3 illustrates a method 300 for implementing PMIP in mobile IP FA CoA mode. The method 300 may be performed by a network node 214 that is a proxy for mobile IP client functionality in an AT 216.

The network node 214 may determine 302 the HoA 206 of the AT 216. Once the network node 214 has determined 302 the HoA 206 of the AT 216, the network node 214 may communicate with the home agent 202 in order to bind 304 the IP address 204 of the network node 214 with the HoA 206 of the AT 216 and establish 306 a tunnel 212 between the network node 214 and the home agent 202.

Once the tunnel 212 has been established, when the home agent 202 receives 308 packets 210 that are destined for the AT 216, the home agent 202 may send 310 the packets 210 to the network node 214 via the tunnel 212. When the network node 214 receives 312 packets 208 from the AT 216 that are destined for a CN 218, the network node 214 may send 314 the packets 208 to the home agent 202 via the tunnel 212.

Figure 4:
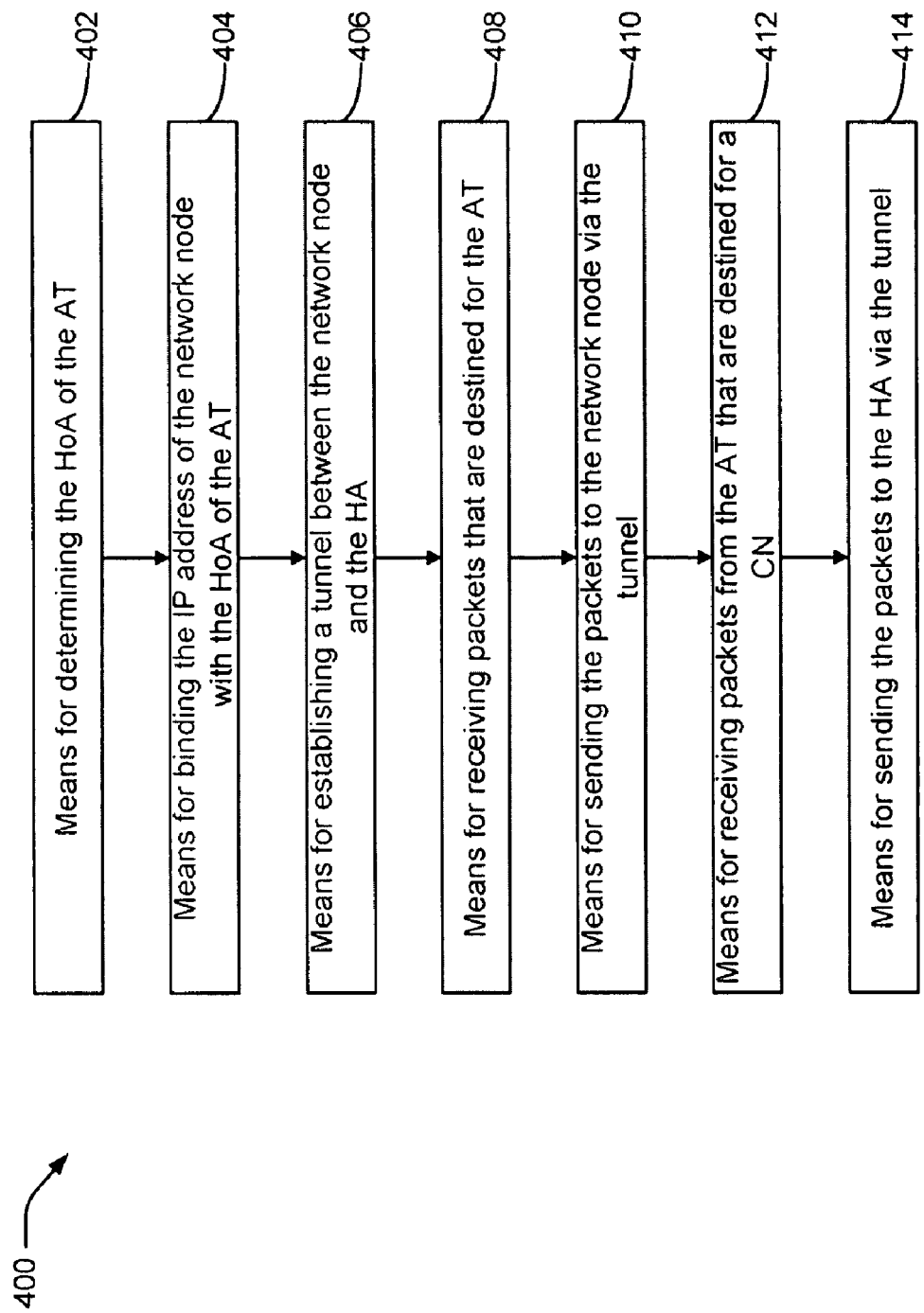
FIG. 4 illustrates means-plus-function blocks corresponding to the method shown in FIG. 3.

The method 300 of FIG. 3 described above may be performed by various hardware and/or software component(s) and/or module(s) corresponding to the means-plus-function blocks 400 illustrated in FIG. 4. In other words, blocks 302 through 314 illustrated in FIG. 3 correspond to means-plus-function blocks 402 through 414 illustrated in FIG. 4.

Figure 5:
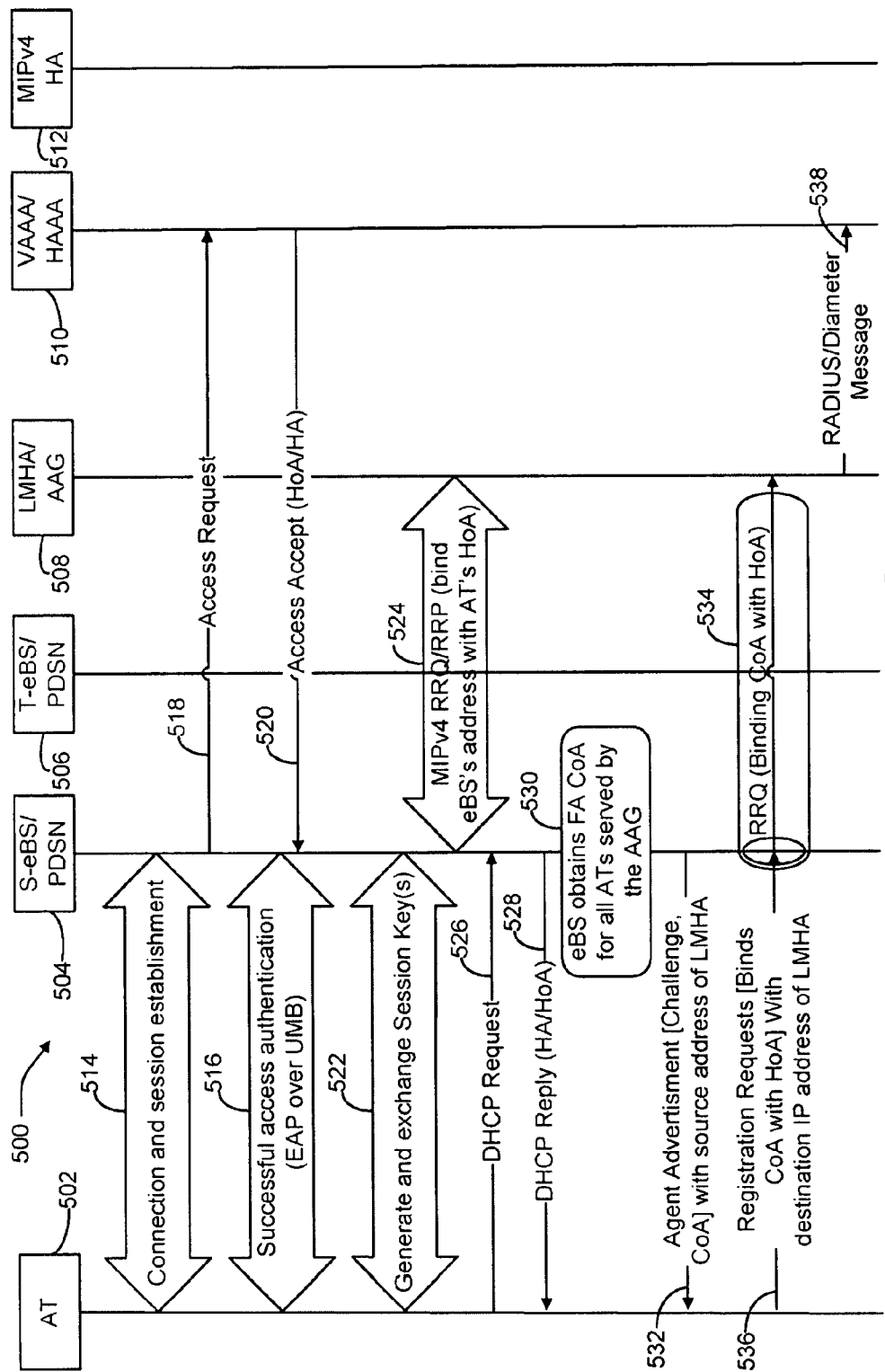
FIG. 5 illustrates another method for implementing PMIP in mobile IP FA CoA mode.
Figure 5:
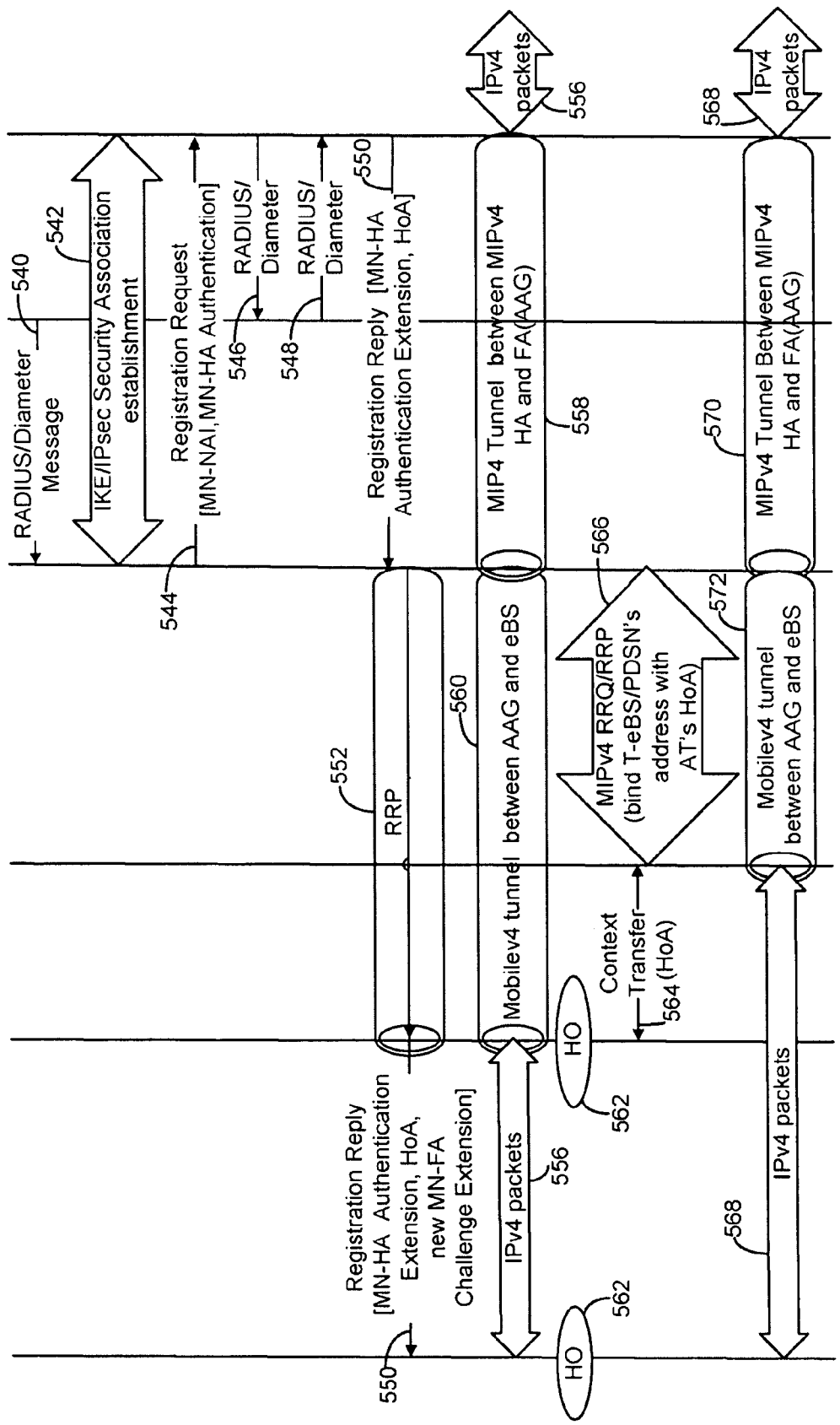

FIG. 5 illustrates another method 500 for implementing PMIP in mobile IP FA CoA mode. The method 500 involves an AT 502, a source e-BS/PDSN (S-eBS/PDSN) 504, a target eBS/PDSN (T-eBS/PDSN) 506, an LMHA/AAG 508, a VAAA/HAAA 510, and an MIPv4 HA 512. The S-eBS/PDSN 504 and the T-eBS/PDSN 506 are proxies for mobile IP client functionality in the AT 502.

Connection and session establishment 514 may occur between the AT 502 and the S-eBS/PDSN 504. Successful access authentication 516 may occur between the AT 502 and the S-eBS/PDSN 504. This may include the S-eBS/PDSN 504 sending an access request message 518 to the VAAA/HAAA 510, and the VAAA/HAAA 510 sending an access accept message 520 to the S-eBS/PDSN 504. The access accept message 520 may include the HoA of the AT 502. Thus, the S-eBS/PDSN 504 may determine the HoA of the AT 502 by receiving it from the VAAA/HAAA 510 during authentication. The AT 502 and the S-eBS/PDSN 504 may generate and exchange 522 session keys. The S-eBS/PDSN 504 and the LMHA/AAG 508 may communicate via MIPv4 RRQ/RRP in order to bind 524 the IP address of the S-eBS/PDSN 504 with the HoA of the AT 502.

The AT 502 may send a DHCP request 526 to the S-eBS/PDSN 504. The S-eBS/PDSN 504 may send a DHCP reply 528 to the AT 502. The DHCP reply 528 may include the HoA of the AT 502. The S-eBS/PDSN 504 may obtain 530 the FA CoA for all ATs that are served by the AAG 508.

The S-eBS/PDSN 504 may send an agent advertisement message 532 to the AT 502. The source address of the agent advertisement message 532 may be the LMHA 508. The AT 502 may send a registration request 536 that binds the CoA with the HoA. The destination IP address of the registration request 536 may be the LMHA 508. The registration request 536 may be sent from the AT 502 to the S-eBS/PDSN 504. The S-eBS/PDSN 504 may then send the registration request 536 to the LMHA/AAG 508 via a tunnel 534.

The LMHA/AAG 508 may send a RADIUS/Diameter Message 538 to the VAAA/HAAA 510. The VAAA/HAAA 510 may send a RADIUS/Diameter Message 540 to the LMHA/AAG 508. IKE/IPsec Security Association establishment 542 may occur between the LMHA/AAG 508 and the MIPv4 HA 512. The LMHA/AAG 508 may send a registration request message 544 to the MIPv4 HA 512. The MIPv4 HA 512 may send a RADIUS/Diameter message 546 to the VAAA/HAAA 510. The VAAA/HAAA 510 may send a RADIUS/Diameter message 548 to the MIPv4 HA 512.

The MIPv4 HA 512 may send a registration reply message 550 to the LMHA/AAG 508. The LMHA/AAG 508 may send the registration reply message 550 to the S-eBS/PDSN 504 via a tunnel 552. The S-eBS/PDSN 504 may then send the registration reply message 550 to the AT 502.

IPv4 packets 556 may be sent between the MIPv4 HA 512 and the LMHA/AAG 508 via an MIPv4 tunnel 558. IPv4 packets 556 may be sent between the LMHA/AAG 508 and the S-eBS/PDSN 504 via another MIPv4 tunnel 560.

When the MIPv4 HA 512 receives packets that are destined for the HoA of the AT 502, the MIPv4 HA 512 may send the packets to the LMHA/AAG 508 via the tunnel 558. The LMHA/AAG 508 may then send the packets to the S-eBS/PDSN 504 via the tunnel 560. The S-eBS/PDSN 504 may then send the packets to the AT 502.

When the S-eBS/PDSN 504 receives packets from the AT 502 that are destined for a CN (not shown), the S-eBS/PDSN 504 may send the packets to the LMHA/AAG 508 via the tunnel 560. The LMHA/AAG 508 may then send the packets to the MIPv4 HA 512 via the tunnel 558. The MIPv4 HA 512 may then send the packets to the CN.

At some point, handoff 562 of the AT 502 may occur from the S-eBS/PDSN 504 to the T-eBS/PDSN 506. This may include context transfer 564 between the S-eBS/PDSN 504 and the T-eBS/PDSN 506. As part of context transfer 564, the S-eBS/PDSN 504 may notify the T-eBS/PDSN 506 about the HoA of the AT 502.

The T-eBS/PDSN 506 and the LMHA/AAG 508 may communicate via MIPv4 RRQ/RRP in order to bind 566 the IP address of the T-eBS/PDSN 506 with the HoA of the AT 502. IPv4 packets 568 may be sent between the MIPv4 HA 512 and the LMHA/AAG 508 via an MIPv4 tunnel 570. IPv4 packets 568 may be sent between the LMHA/AAG 508 and the T-eBS/PDSN 506 via an MIPv4 tunnel 572.

Figure 6:
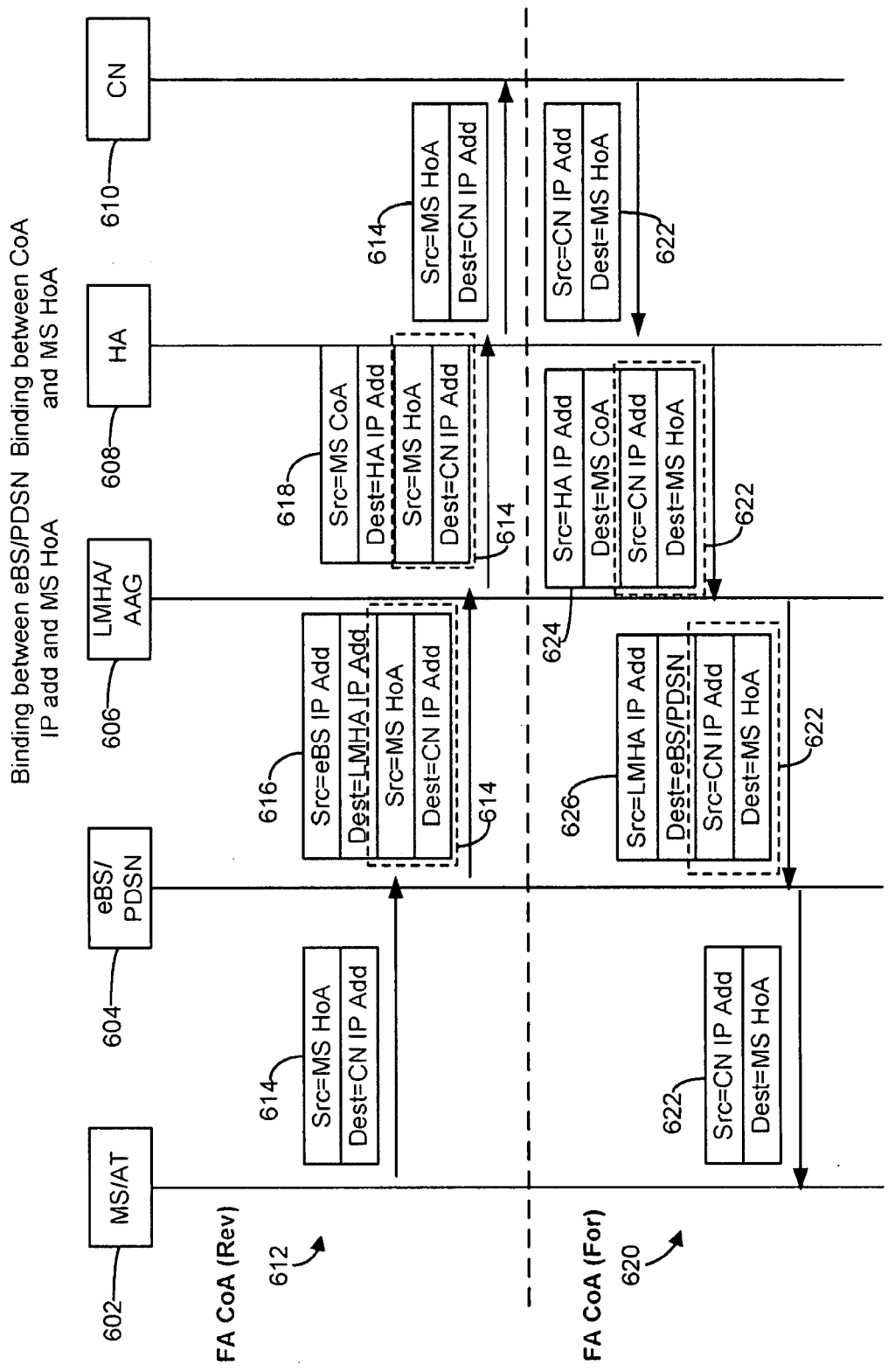
FIG. 6 illustrates an example showing packet headers as packets travel from an MS/AT to a CN on the reverse link, and also as packets travel from the CN to the MS/AT on the forward link.

FIG. 6 illustrates an example showing packet headers as packets travel from a MS/AT 602 to a CN 610 on the reverse link 612, and also as packets travel from the CN 610 to the MS/AT 602 on the forward link 620. An MS/AT 602, eBS/PDSN 604, LMHA/AAG 606, HA 608, and CN 610 are shown. At the LMHA/AAG 606, there is binding between the IP address of the eBS/PDSN 604 and the HoA of the MS/AT 602. At the HA 608, there is binding between the CoA and the HoA of the MS/AT 602.

The FA CoA on the reverse link 612 will be discussed first. The MS/AT 602 sends a packet 614 to the eBS/PDSN 604. The source address of the packet 614 is the HoA of the MS/AT 602. The destination address of the packet 614 is the IP address of the CN 610.

The eBS/PDSN 604 then sends a packet 616 to the LMHA/AAG 606. The packet 616 includes the original packet 614 sent from the MS/AT 602 to the eBS/PDSN 604. The source address of the packet 616 is the IP address of the eBS/PDSN 604. The destination address of the packet 616 is the IP address of the LMHA/AAG 606.

The LMHA/AAG 606 then sends a packet 618 to the HA 608. The packet 618 includes the original packet 614 sent from the MS/AT 602 to the eBS/PDSN 604. The source address of the packet 618 is the CoA of the MS/AT 602. The destination address of the packet 618 is the IP address of the HA 608. The HA 608 then sends the original packet 614 to the CN 610.

The FA CoA on the forward link 620 will be discussed next. The CN 610 sends a packet 622 to the HA 608. The source address of the packet 622 is the IP address of the CN 610. The destination address of the packet 622 is the HoA of the MS/AT 602.

The HA 608 then sends a packet 624 to the LMHA/AAG 606. The packet 624 includes the original packet 622 sent from the CN 610 to the HA 608. The source address of the packet 624 is the IP address of the HA 608. The destination address of the packet 624 is the CoA of the MS/AT 602.

The LMHA/AAG 606 then sends a packet 626 to the eBS/PDSN 604. The packet 626 includes the original packet 622 sent from the CN 610 to the HA 608. The source address of the packet 626 is the IP address of the LMHA/AAG 606. The destination address of the packet 626 is the IP address of the eBS/PDSN 604. The eBS/PDSN 604 then sends the original packet 622 to the MS/AT 602.

Figure 7:
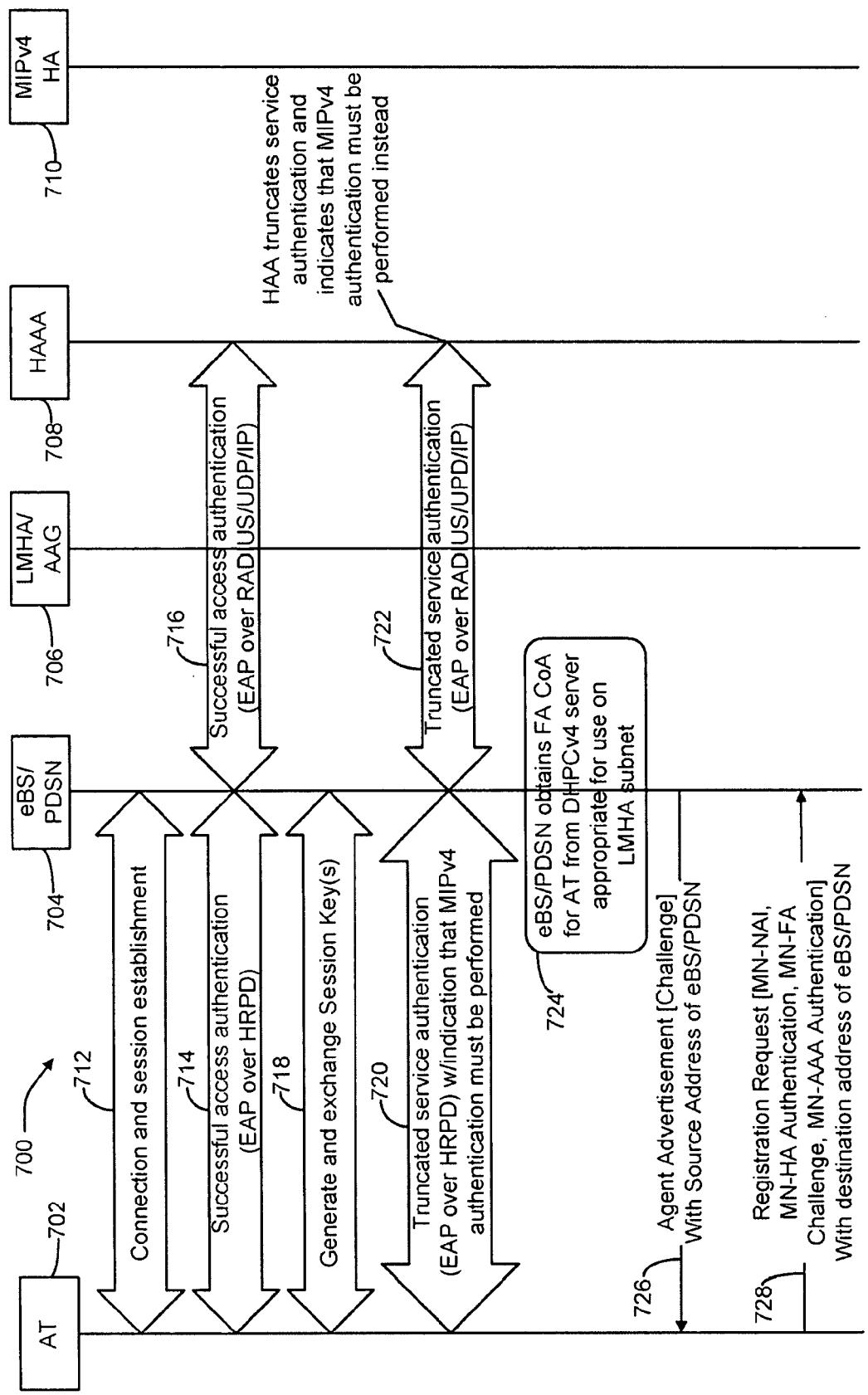
FIG. 7 illustrates another method for implementing PMIP in mobile IP FA CoA mode.
Figure 7:
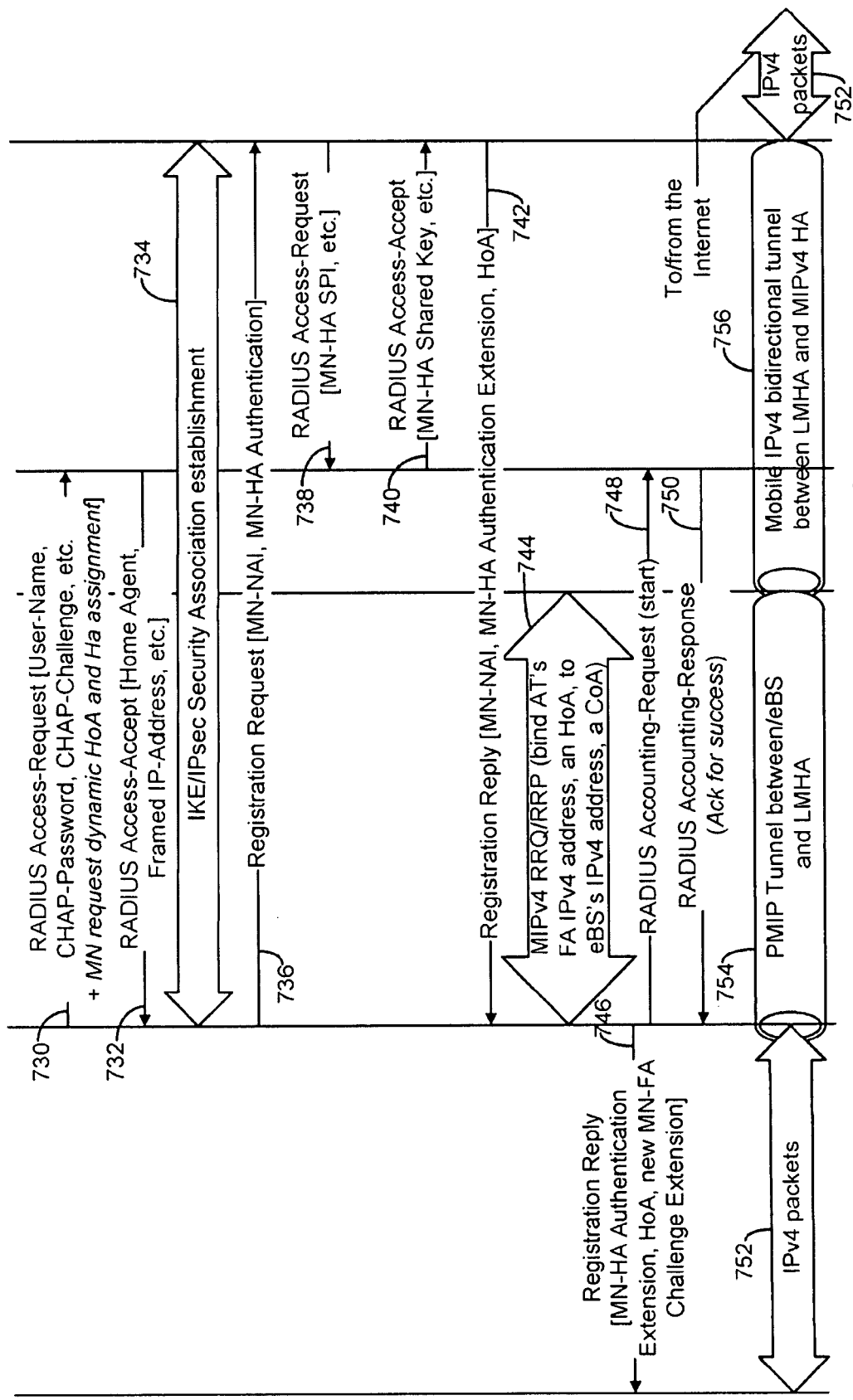

FIG. 7 illustrates another method 700 for implementing PMIP in mobile IP FA CoA mode. The method 700 involves an AT 702, an eBS/PDSN 704, an LMHA/AAG 706, an HAAA 708, and an MIPv4 HA 710. The eBS/PDSN 704 is a proxy for mobile IP client functionality in the AT 702.

Connection and session establishment 712 may occur between the AT 702 and the eBS/PDSN 704. Successful access authentication 714 may occur between the AT 702 and the eBS/PDSN 704. Successful access authentication 716 may also occur between the eBS/PDSN 704 and the HAAA 708. The AT 702 and the eBS/PDSN 704 may generate and exchange 718 session keys.

Service authentication 720 between the AT 702 and the eBS/PDSN 704 may be truncated. In addition, service authentication 722 involving the eBS/PDSN 704 and the HAAA 708 may be truncated. The HAAA 708 may truncate the service authentication and indicate that MIPv4 authentication is going to be performed instead. The eBS/PDSN 704 may obtain 724 the FA CoA for the AT 702 that is appropriate for use on the LMHA 706 subnet. This may be obtained from the DHCPv4 server.

The eBS/PDSN 704 may send an agent advertisement message 726 to the AT 702. The source address of the agent advertisement message 726 may be the eBS/PDSN 704.

The AT 702 may send a registration request message 728 to the eBS/PDSN 704. The destination address of the registration request message 728 may be the eBS/PDSN 704. The eBS/PDSN 704 may send a RADIUS access-request message 730 to the HAAA 708. The HAAA 708 may send a RADIUS access-accept message 732 to the eBS/PDSN 704.

The eBS/PDSN 704 may send a registration request message 736 to the MIPv4 HA 710. The MIPv4 HA 710 may send a RADIUS access-request message 738 to the HAAA 708. The HAAA 708 sending a RADIUS access-accept message 740 to the MIPv4 HA 710. The MIPv4 HA 710 may then send a registration reply message 742 to the eBS/PDSN 704. The registration reply message 742 may include the HoA of the AT 702. Thus, the eBS/PDSN 704 may determine the HoA of the AT 702 by receiving it from the MIPv4 HA 710.

The eBS/PDSN 704 and the LMHA/AAG 706 may communicate via MIPv4 RRQ/RRP in order to bind 744 the IP address of the eBS/PDSN 704 with the HoA of the AT 702. More specifically, the FA IPv4 address of the AT 702 (which is an HoA) may be bound to the IPv4 address of the eBS/PDSN 704 (which is a CoA).

The eBS/PDSN 704 may send a registration reply 746 to the AT 702. The eBS/PDSN 704 may send a RADIUS accounting-request 748 to the HAAA 708. The HAAA 708 may send a RADIUS accounting-response 750 to the eBS/PDSN 704.

IPv4 packets 752 may be sent between the MIPv4 HA 710 and the LMHA/AAG 706 via an MIPv4 bidirectional tunnel 756. IPv4 packets 752 may be sent between the LMHA/AAG 706 and the eBS/PDSN 704 via a PMIP tunnel 754.

When the MIPv4 HA 710 receives packets that are destined for the HoA of the AT 702, the MIPv4 HA 710 may send the packets to the LMHA/AAG 706 via the MIPv4 bidirectional tunnel 756. The LMHA/AAG 706 may then send the packets to the eBS/PDSN 704 via the PMIP tunnel 754. The eBS/PDSN 704 may then send the packets to the AT 702.

When the eBS/PDSN 704 receives packets from the AT 702 that are destined for a CN (not shown), the eBS/PDSN 704 may send the packets to the LMHA/AAG 706 via the PMIP tunnel 754. The LMHA/AAG 706 may then send the packets to the MIPv4 HA 710 via the MIPv4 tunnel 756. The MIPv4 HA 710 may then send the packets to the CN.

Figure 8:
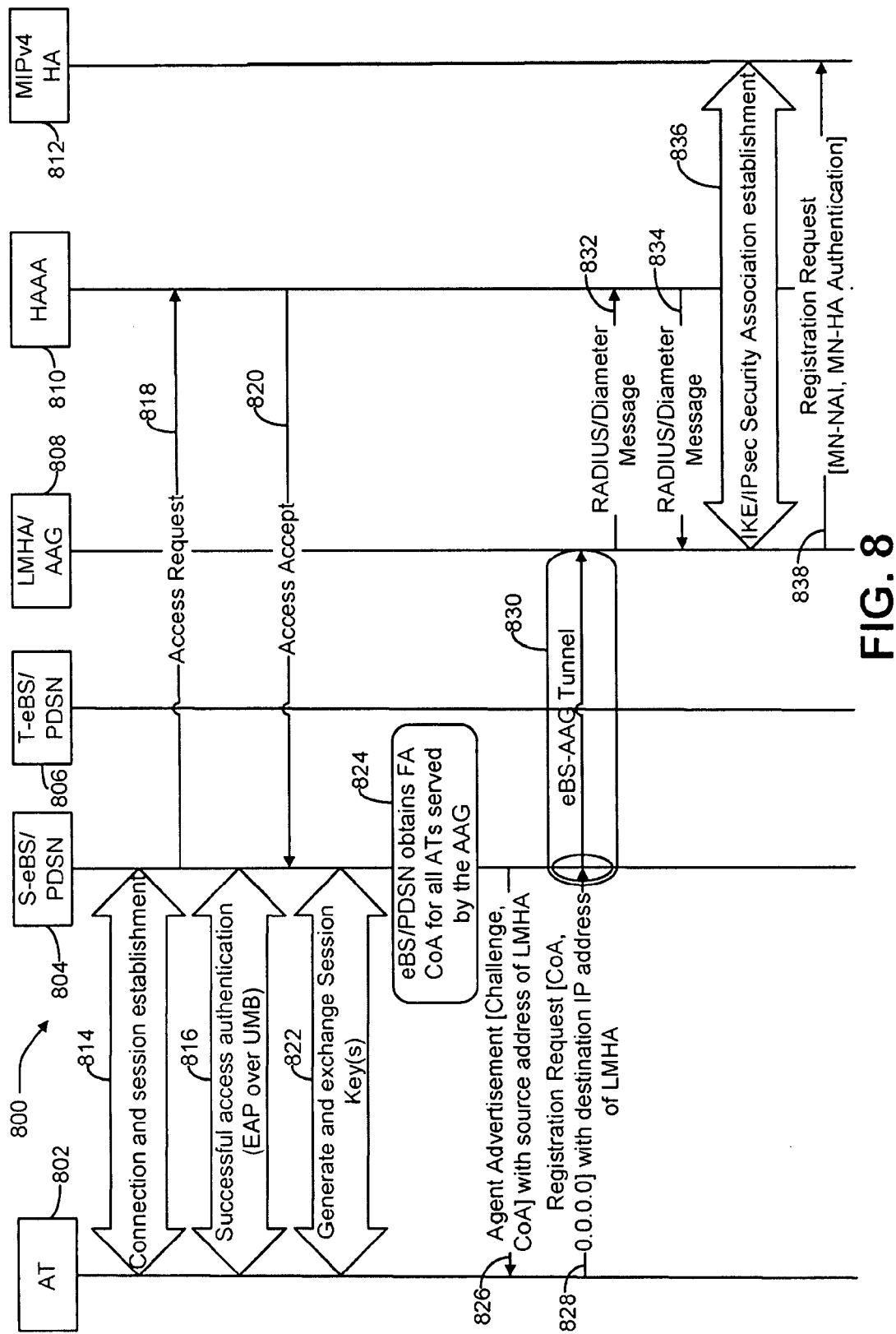
FIG. 8 illustrates another method for implementing PMIP in mobile IP FA CoA mode.
Figure 8:
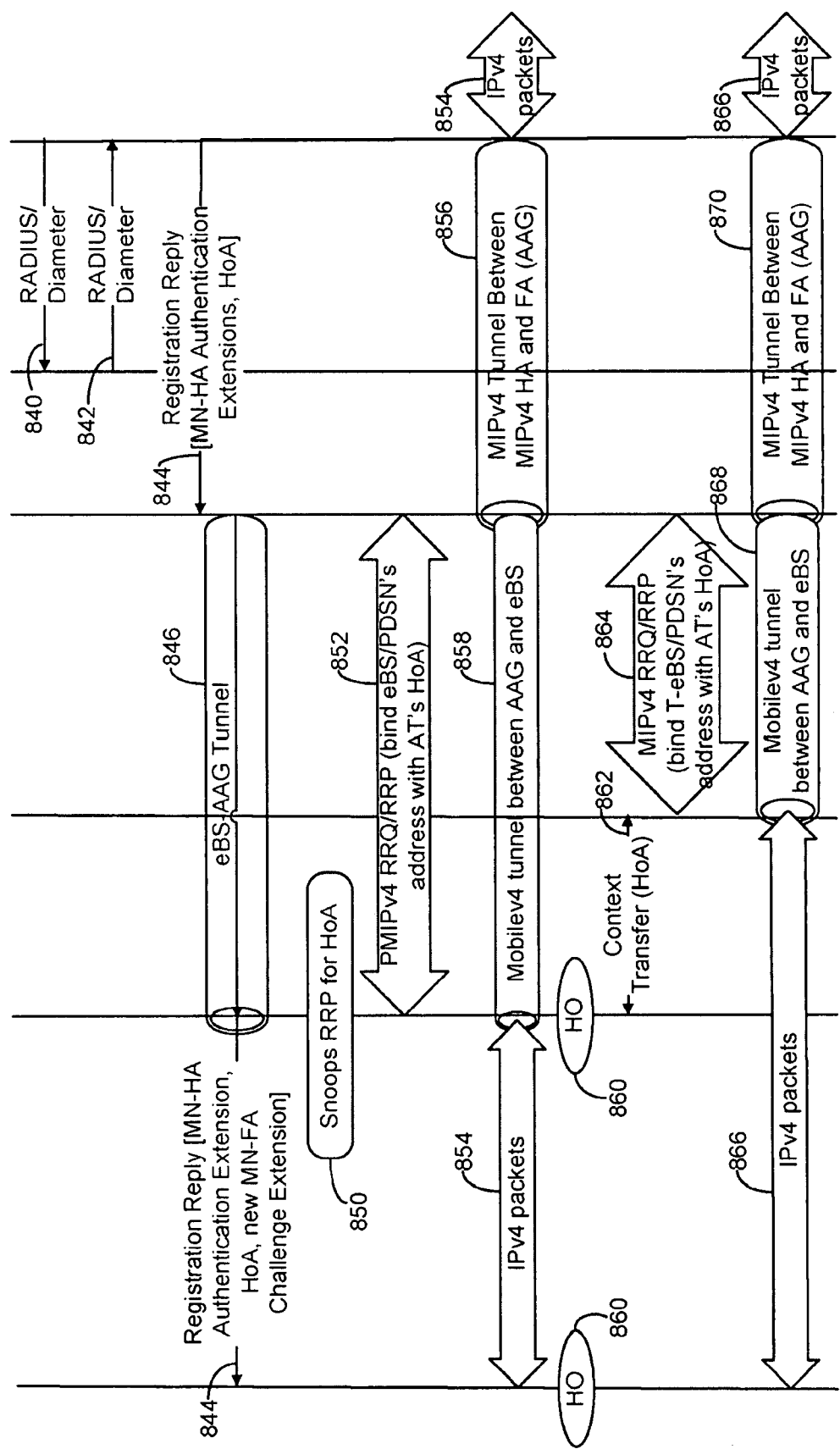

FIG. 8 illustrates another method 800 for implementing PMIP in mobile IP FA CoA mode. The method 800 involves an AT 802, an S-eBS/PDSN 804, a T-eBS/PDSN 806, an LMHA/AAG 808, an HAAA 810, and an MIPv4 HA 812. The S-eBS/PDSN 804 and the T-eBS/PDSN 806 are proxies for mobile IP client functionality in the AT 802. Connection and session establishment 814 may occur between the AT 802 and the S-eBS/PDSN 804. Successful access authentication 816 may occur between the AT 802 and the S-eBS/PDSN 804. This may involve the S-eBS/PDSN 804 sending an access request message 818 to the HAAA 810, and the HAAA 810 sending an access accept message 820 to the S-eBS/PDSN 804.

The AT 802 and the S-eBS/PDSN 804 may generate and exchange 822 session key(s). The S-eBS/PDSN 804 may obtain 824 the FA CoA for all ATs that are served by the AAG 808.

The S-eBS/PDSN 804 may send an agent advertisement message 826 to the AT 802. The source address of the agent advertisement message 826 may be the LMHA 808. The AT 802 may send a registration request message 828 to the S-eBS/PDSN 804. The destination address of the registration request message 828 may be the LMHA 808. The S-eBS/PDSN 804 may send the registration request message 828 to the LMHA/AAG 808 via a tunnel 830.

The LMHA/AAG 808 may send a RADIUS/diameter message 832 to the HAAA 810. The HAAA 810 may send a RADIUS/diameter message 834 to the LMHA/AAG 808. IKE/IPsec security association establishment may occur 836 between the LMHA/AAG 808 and the MIPv4 HA 812.

The LMHA/AAG 808 may send a registration request 838 to the MIPv4 HA 812. The MIPv4 HA 812 may send a RADIUS/diameter message 840 to the HAAA 810. The HAAA 810 may send a RADIUS/diameter message 842 to the MIPv4 HA 812.

The MIPv4 HA 812 may send a registration reply message 844 to the LMHA/AAG 808. The LMHA/AAG 808 may send the registration reply message 844 to the S-eBS/PDSN 804 via a tunnel 846. The S-eBS/PDSN 804 may send the registration reply message 844 to the AT 802. The registration reply message 844 may include the HoA of the AT 802. The S-eBS/PDSN 804 may determine the HoA of the AT 802 by snooping 850 the registration reply message 844. The S-eBS/PDSN 804 and the LMHA/AAG 808 may communicate via PMIPv4 RRQ/RRP in order to bind 852 the IP address of the S-eBS/PDSN 804 with the HoA of the AT 802.

IPv4 packets 854 may be sent between the MIPv4 HA 812 and the LMHA/AAG 808 via an MIPv4 tunnel 856. IPv4 packets 854 may be sent between the LMHA/AAG 808 and the S-eBS/PDSN 804 via another MIPv4 tunnel 858.

When the MIPv4 HA 812 receives packets that are destined for the HoA of the AT 802, the MIPv4 HA 812 may send the packets to the LMHA/AAG 808 via the tunnel 856. The LMHA/AAG 808 may then send the packets to the S-eBS/PDSN 804 via the tunnel 858. The S-eBS/PDSN 804 may then send the packets to the AT 802.

When the S-eBS/PDSN 804 receives packets from the AT 802 that are destined for a CN (not shown), the S-eBS/PDSN 804 may send the packets to the LMHA/AAG 808 via the tunnel 858. The LMHA/AAG 808 may then send the packets to the MIPv4 HA 812 via the tunnel 856. The MIPv4 HA 812 may then send the packets to the CN.

At some point, handoff 860 of the AT 802 may occur from the S-eBS/PDSN 804 to the T-eBS/PDSN 806. As part of the handoff 860, context transfer 862 may occur between the S-eBS/PDSN 804 and the T-eBS/PDSN 806. The S-eBS/PDSN 804 may notify the T-eBS/PDSN 806 about the HoA of the AT 802. The T-eBS/PDSN 806 and the LMHA/AAG 808 may communicate via MIPv4 RRQ/RRP in order to bind 864 the IP address of the T-eBS/PDSN 806 with the HoA of the AT 802.

IPv4 packets 866 may be sent between the MIPv4 HA 812 and the LMHA/AAG 808 via an MIPv4 tunnel 870. IPv4 packets 866 may be sent between the LMHA/AAG 808 and the T-eBS/PDSN 806 via another MIPv4 tunnel 868.

Figure 9:
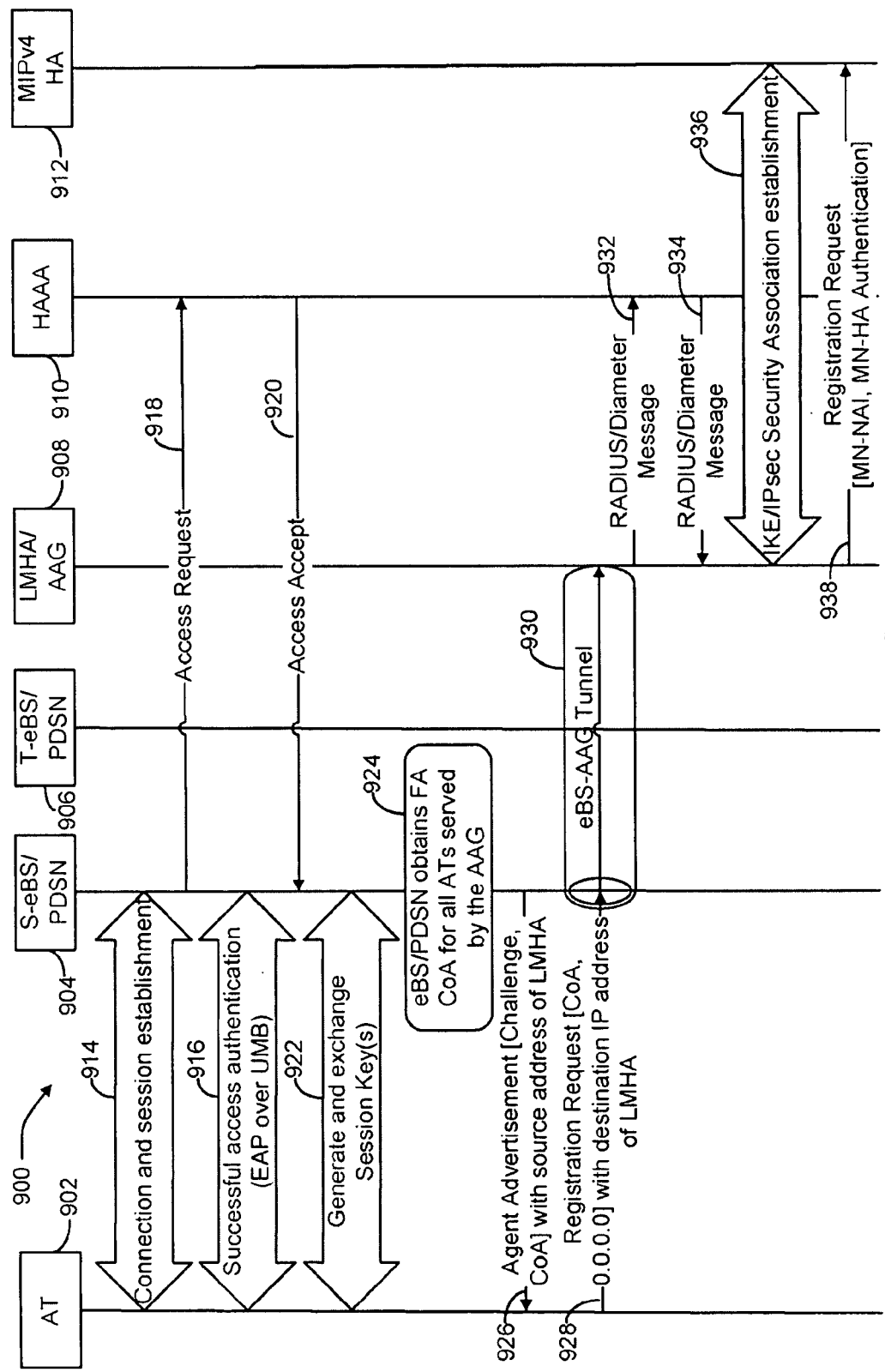
FIG. 9 illustrates another method for implementing PMIP in mobile IP FA CoA mode.
Figure 9:
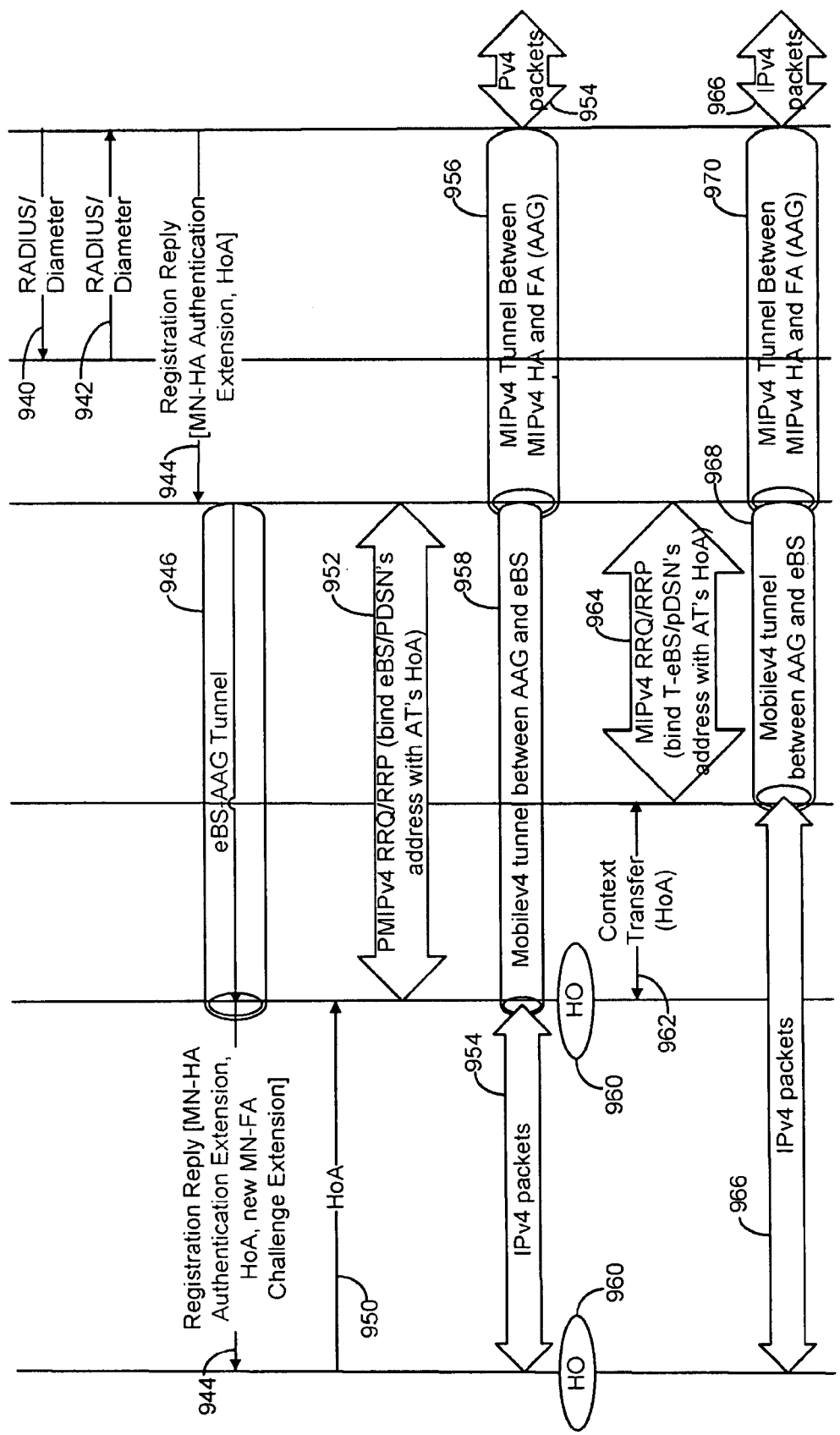

FIG. 9 illustrates another method 900 for implementing PMIP in mobile IP FA CoA mode. The method 900 involves an AT 902, an S-eBS/PDSN 904, a T-eBS/PDSN 906, an LMHA/AAG 908, an HAAA 910, and an MIPv4 HA 912. The S-eBS/PDSN 904 and the T-eBS/PDSN 906 are proxies for mobile IP client functionality in the AT 902. Connection and session establishment may occur 914 between the AT 902 and the S-eBS/PDSN 904. Successful access authentication may occur 916 between the AT 902 and the S-eBS/PDSN 904. This may include the S-eBS/PDSN 904 sending an access request message 918 to the HAAA 910, and the HAAA 910 sending an access accept message 920 to the S-eBS/PDSN 904. The AT 902 and the S-eBS/PDSN 904 may generate and exchange 922 session key(s). The S-eBS/PDSN 904 may obtain 924 the FA CoA for all ATs that are served by the AAG 908.

The S-eBS/PDSN 904 may send an agent advertisement message 926 to the AT 902. The source address of the agent advertisement message 926 may be the LMHA 908. The AT 902 may send a registration request message 928 to the S-eBS/PDSN 904. The destination address of the registration request message 928 may be the LMHA 908. The S-eBS/PDSN 904 may send the registration request message 928 to the LMHA/AAG 908 via a tunnel 930.

The LMHA/AAG 908 may send a RADIUS/diameter message 932 to the HAAA 910. The HAAA 910 may send a RADIUS/diameter message 934 to the LMHA/AAG 908. IKE/IPsec security association establishment may occur 936 between the LMHA/AAG 908 and the MIPv4 HA 912.

The LMHA/AAG 908 may send a registration request 938 to the MIPv4 HA 912. The MIPv4 HA 912 may send a RADIUS/diameter message 940 to the HAAA 910. The HAAA 910 may send a RADIUS/diameter message 942 to the MIPv4 HA 912.

The MIPv4 HA 912 may send a registration reply message 944 to the LMHA/AAG 908. The LMHA/AAG 908 may send the registration reply message 944 to the S-eBS/PDSN 904 via a tunnel 946. The S-eBS/PDSN 904 may send the registration reply message 944 to the AT 902. The registration reply message 944 may include the HoA of the AT 902.

The AT 902 may then send 950 its HoA to the S-eBS/PDSN 904. Thus, the S-eBS/PDSN 904 may determine the HoA of the AT 902 by receiving it from the AT 902. The S-eBS/PDSN 904 and the LMHA/AAG 908 may communicate via PMIPv4 RRQ/RRP in order to bind 952 the IP address of the S-eBS/PDSN 904 with the HoA of the AT 902.

IPv4 packets 954 may be sent between the MIPv4 HA 912 and the LMHA/AAG 908 via an MIPv4 tunnel 956. IPv4 packets 954 may be sent between the LMHA/AAG 908 and the S-eBS/PDSN 904 via another MIPv4 tunnel 958.

When the MIPv4 HA 912 receives packets that are destined for the HoA of the AT 902, the MIPv4 HA 912 may send the packets to the LMHA/AAG 908 via the tunnel 956. The LMHA/AAG 908 may then send the packets to the S-eBS/PDSN 904 via the tunnel 958. The S-eBS/PDSN 904 may then send the packets to the AT 902.

When the S-eBS/PDSN 904 receives packets from the AT 902 that are destined for a CN (not shown), the S-eBS/PDSN 904 may send the packets to the LMHA/AAG 908 via the tunnel 958. The LMHA/AAG 908 may then send the packets to the MIPv4 HA 912 via the tunnel 956. The MIPv4 HA 912 may then send the packets to the CN.

At some point, handoff 960 of the AT 902 from the S-eBS/PDSN 904 to the T-eBS/PDSN 906 may occur. This may involve a context transfer 962 between the S-eBS/PDSN 904 and the T-eBS/PDSN 906. As part of the handoff 960, context transfer 962 may occur between the S-eBS/PDSN 904 and the T-eBS/PDSN 906. The S-eBS/PDSN 904 may notify the T-eBS/PDSN 906 about the HoA of the AT 902. The T-eBS/PDSN 906 and the LMHA/AAG 908 may communicate via MIPv4 RRQ/RRP in order to bind 964 the IP address of the T-eBS/PDSN 906 with the HoA of the AT 902. IPv4 packets 966 may be sent between the MIPv4 HA 912 and the LMHA/AAG 908 via an MIPv4 tunnel 970. IPv4 packets 966 may be sent between the LMHA/AAG 908 and the T-eBS/PDSN 906 via another MIPv4 tunnel 968.

Figure 10:
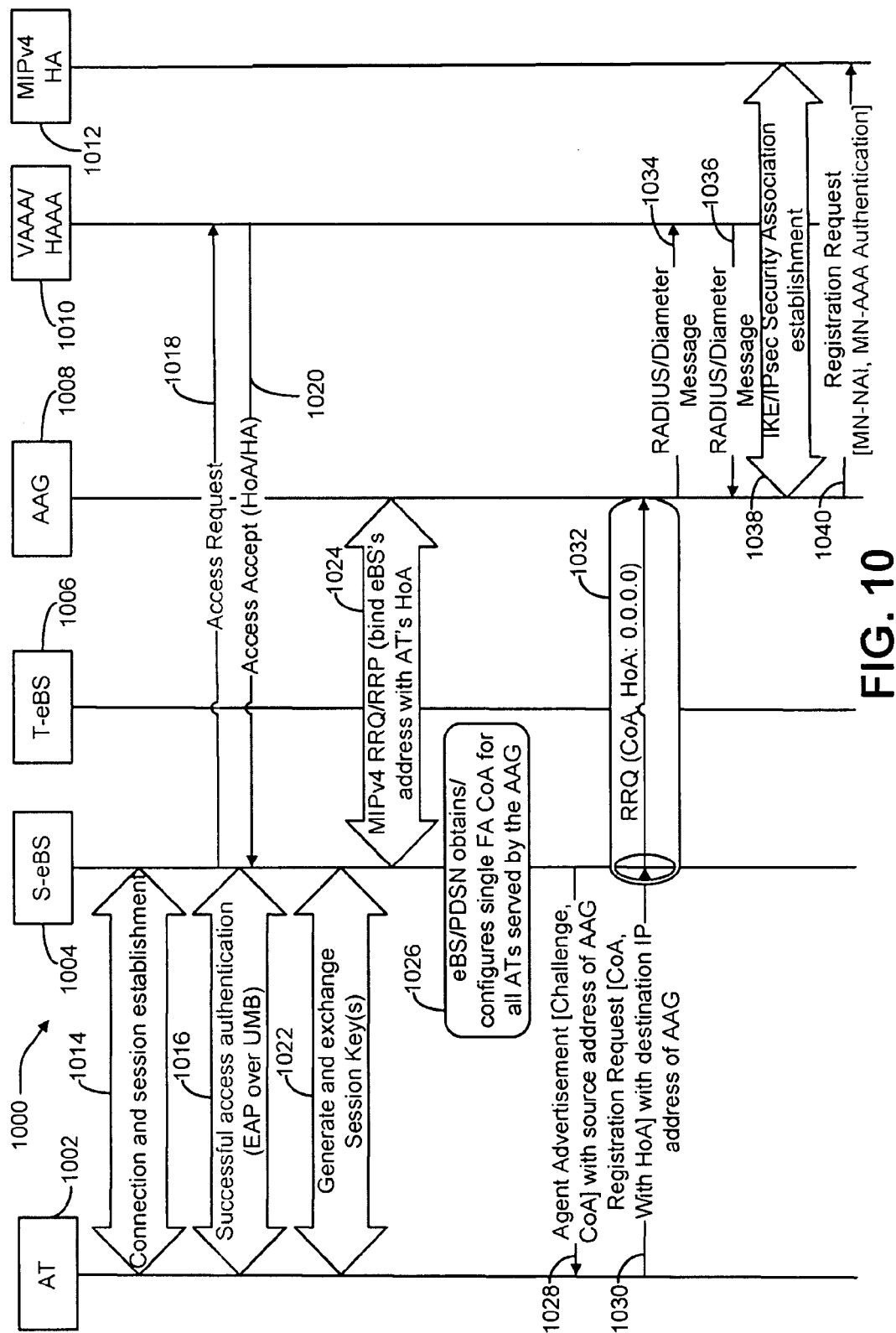
FIG. 10 illustrates another method for implementing PMIP in mobile IP FA CoA mode.
Figure 10:
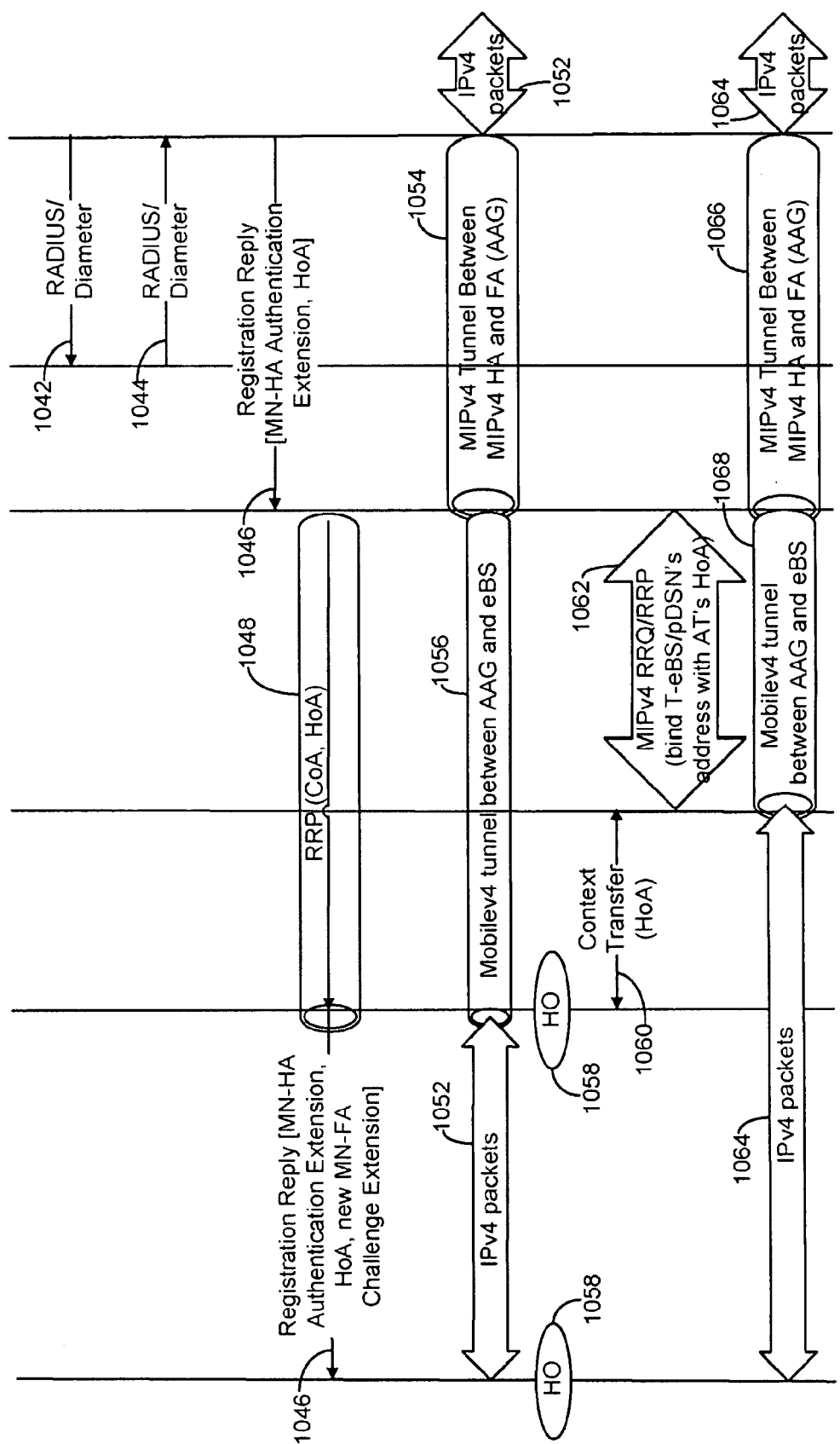
Figure 11:
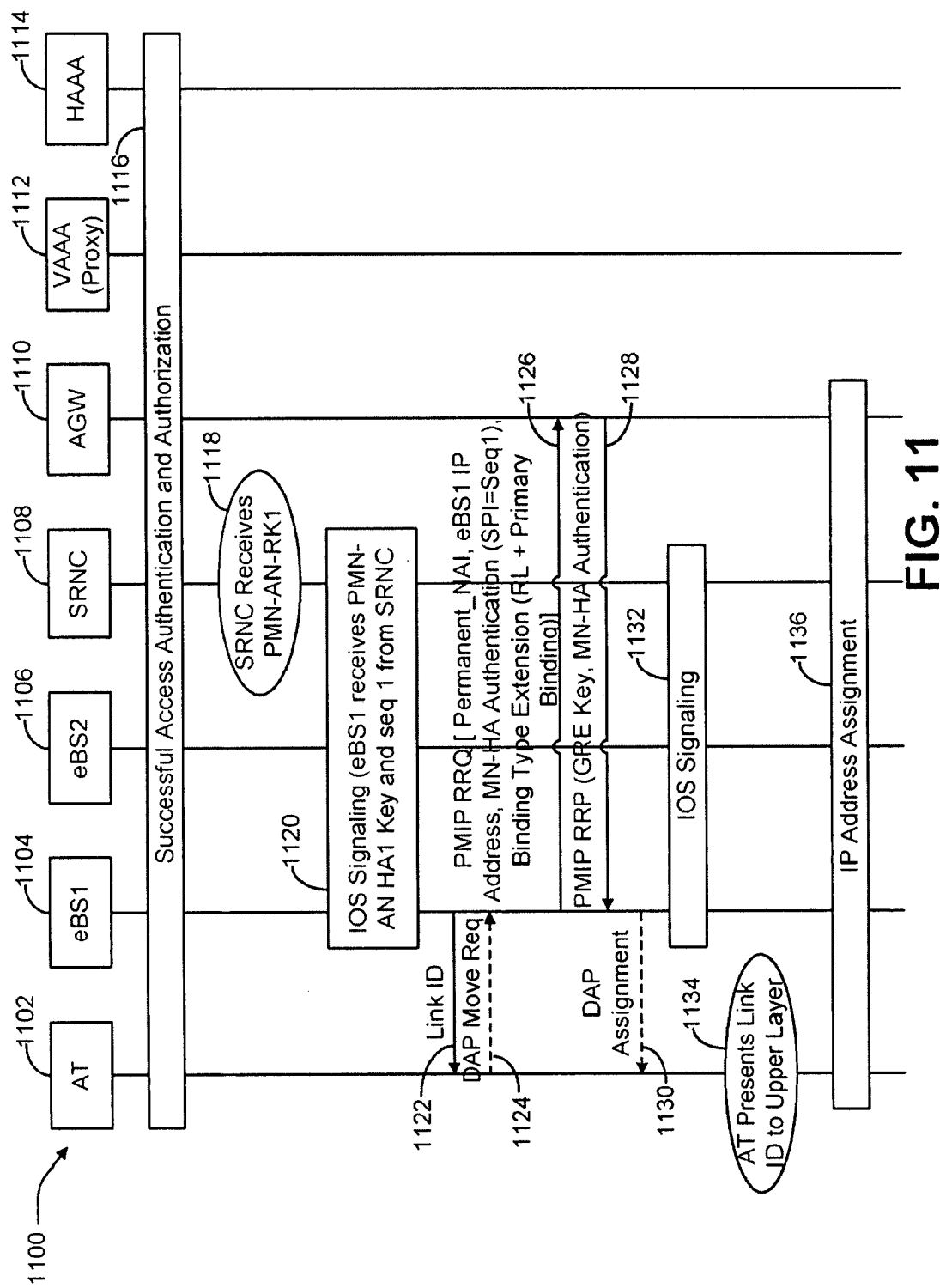
FIG. 11 illustrates another method for implementing PMIP in mobile IP FA CoA mode.

FIG. 10 illustrates another method 1000 for implementing PMIP in mobile IP FA CoA mode. The method 1000 involves an AT 1002, an S-eBS 1004, a T-eBS 1006, an AAG 1008, a VAAA/HAAA 1010, and an MIPv4 HA 1012. The S-eBS 1004 and the T-eBS 1006 are proxies for mobile IP client functionality in the AT 1002.

Connection and session establishment may occur 1014 between the AT 1002 and the S-eBS 1004. Access authentication may occur 1016 between the AT 1002 and the S-eBS 1004. This may include the S-eBS 1004 sending an access request message 1018 to the VAAA/HAAA 1010, and the VAAA/HAAA 1010 sending an access accept message 1020 to the S-eBS 1004. The access accept message 1020 may include the HoA of the AT 1002. Thus, the S-eBS 1004 may determine the HoA of the AT 1002 by receiving it from the VAAA/HAAA 1010 during authentication.

The AT 1002 and the S-eBS 1004 may generate and exchange 1022 session key(s). The S-eBS 1004 and the LMHA/AAG 1008 may communicate via MIPv4 RRQ/RRP in order to bind 1024 the IP address of the S-eBS 1004 with the HoA of the AT 1002. The S-eBS 1004 may obtain/configure 1026 the FA CoA for all ATs that are served by the AAG 1008.

The S-eBS 1004 may send an agent advertisement message 1028 to the AT 1002. The source address of the agent advertisement message 1028 may be the AAG 1008. The AT 1002 may send a registration request message 1030 to the S-eBS 1004. The destination address of the registration request message 1030 may be the AAG 1030. The S-eBS 1004 may send the registration request message 1030 to the AAG 1008 via a tunnel 1032.

The AAG 1008 may send a RADIUS/diameter message 1034 to the VAAA/HAAA 1010. The VAAA/HAAA 1010 may send a RADIUS/diameter message 1036 to the AAG 1008. IKE/IPsec security association establishment may occur 1038 between the AAG 1008 and the MIPv4 HA 1012.

The AAG 1008 may send a registration request 1040 to the MIPv4 HA 1012. The MIPv4 HA 1012 may send a RADIUS/diameter message 1042 to the VAAA/HAAA 1010. The VAAA/HAAA 1010 may send a RADIUS/diameter message 1044 to the MIPv4 HA 1012. The MIPv4 HA 1012 may send a registration reply 1046 to the AAG 1008. The AAG 1008 may send the registration reply 1046 to the S-eBS 1004 via a tunnel 1048. The S-eBS 1004 may send the registration reply 1046 to the AT 1002.

IPv4 packets 1052 may be sent between the MIPv4 HA 1012 and the AAG 1008 via an MIPv4 tunnel 1054. IPv4 packets 1052 may be sent between the AAG 1008 and the S-eBS 1004 via another MIPv4 tunnel 1056.

When the MIPv4 HA 1012 receives packets that are destined for the HoA of the AT 1002, the MIPv4 HA 1012 may send the packets to the AAG 1008 via the tunnel 1054. The AAG 1008 may then send the packets to the S-eBS 1004 via the tunnel 1056. The S-eBS 1004 may then send the packets to the AT 1002.

When the S-eBS 1004 receives packets from the AT 1002 that are destined for a CN (not shown), the S-eBS 1004 may send the packets to the AAG 1008 via the tunnel 1056. The AAG 1008 may then send the packets to the MIPv4 HA 1012 via the tunnel 1054. The MIPv4 HA 1012 may then send the packets to the CN.

At some point, handoff 1058 of the AT 1002 from the S-eBS/PDSN 1004 to the T-eBS/PDSN 1006 may occur. This may involve a context transfer 1060 between the S-eBS/PDSN 1004 and the T-eBS/PDSN 1006. As part of the handoff 1058, context transfer 1060 may occur between the S-eBS/PDSN 1004 and the T-eBS/PDSN 1006. The S-eBS/PDSN 1004 may notify the T-eBS/PDSN 1006 about the HoA of the AT 1002. The T-eBS/PDSN 1006 and the LMHA/AAG 1008 may communicate via MIPv4 RRQ/RRP in order to bind 1062 the IP address of the T-eBS/PDSN 1006 with the HoA of the AT 1002.

IPv4 packets 1064 may be sent between the MIPv4 HA 1012 and the LMHA/AAG 1008 via an MIPv4 tunnel 1066. IPv4 packets 1066 may be sent between the LMHA/AAG 1008 and the T-eBS/PDSN 1006 via another MIPv4 tunnel 1068.

FIG. 10 illustrates another method 1100 for implementing PMIP in mobile IP FA CoA mode. An AT 1102, eBS1 1104, eBS2 1106, SRNC 1108, AGW 1110, VAAA (proxy) 1112, and HAAA 1114 are shown. The illustrated method 110 involves a GRE key based approach between the eBS 1104, 1006 and the AGW 1110.

Access authentication and authorization may occur 1116. The SRNC may receive 1118 the PMN-AN-RK1. IOS signaling may occur 1120. The eBS1 1104 may receive the PMN-AN-HA1 key and seq1 from the SRNC 1118.

The eBS1 1104 may send the link ID 1122 to the AT 1102. The AT 1102 may send a DAP move request 1124 to the eBS 1104.

The eBS1 1104 may send a PMIP RRQ message 1126 to the AGW 1110. The AGW 1110 may send a PMIP RRP message 1128 to the eBS1 1104. The eBS1 1104 may send a DAP assignment message 1130 to the AT 1102.

Additional IOS signaling may occur 1132. The AT 1102 may present 1134 the link ID to the upper layer. IP address assignment may then occur 1136.

The PMIP may use a specific GRE tunnel. This may provide certain benefits not present in conventional PMIP or MIP. One benefit may be that the PMIP tunnel can be established before assigning an IP address, hence the tunnel can be used to assign the IP address to the AT from the AGW. Hence, multiple types (IPv4, IPv6, MIPv4, MIPv6) of IP addresses can be assigned to the AT, after the PMIP tunnel is established. Another benefit may be that the same PMIP tunnel can be used to support deployments where overlapping private IP addresses may be used.

Figure 12:
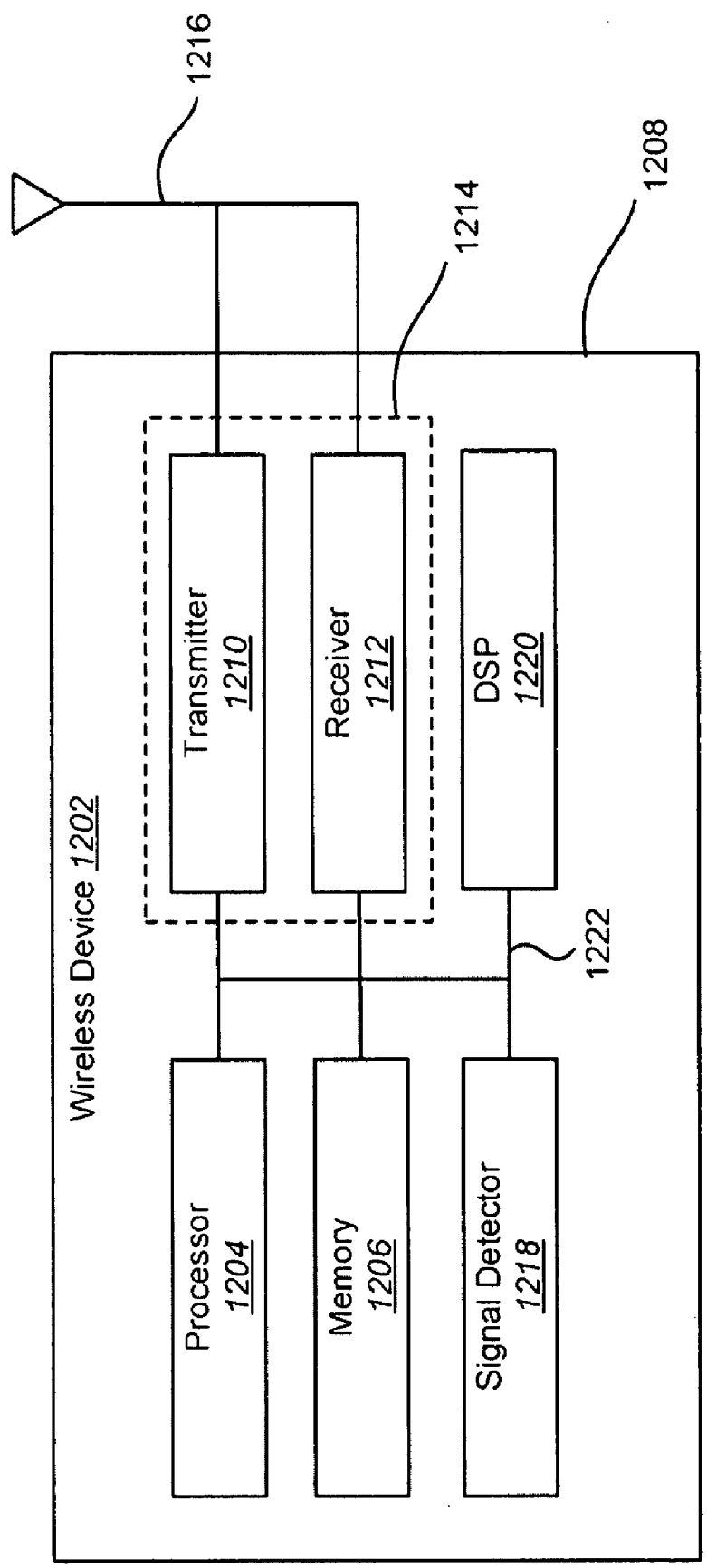
FIG. 12 illustrates various components that may be utilized in a wireless device.

FIG. 12 illustrates various components that may be utilized in a wireless device 1202. The wireless device 1202 is an example of a device that may be configured to implement the various methods described herein.

The wireless device 1202 may include a processor 1204 which controls operation of the wireless device 1202. The processor 1204 may also be referred to as a central processing unit (CPU). Memory 1206, which may include both read-only memory (ROM) and random access memory (RAM), provides instructions and data to the processor 1204. A portion of the memory 1206 may also include non-volatile random access memory (NVRAM). The processor 1204 typically performs logical and arithmetic operations based on program instructions stored within the memory 1206. The instructions in the memory 1206 may be executable to implement the methods described herein.

The wireless device 1202 may also include a housing 1208 that may include a transmitter 1212 and a receiver 1212 to allow transmission and reception of data between the wireless device 1202 and a remote location. The transmitter 1212 and receiver 1212 may be combined into a transceiver 1214. An antenna 1216 may be attached to the housing 1208 and electrically coupled to the transceiver 1214. The wireless device 1202 may also include (not shown) multiple transmitters, multiple receivers, multiple transceivers and/or multiple antenna.

The wireless device 1202 may also include a signal detector 1218 that may be used to detect and quantify the level of signals received by the transceiver 1214. The signal detector 1218 may detect such signals as total energy, pilot energy per pseudonoise (PN) chips, power spectral density, and other signals. The wireless device 1202 may also include a digital signal processor (DSP) 1220 for use in processing signals.

The various components of the wireless device 1202 may be coupled together by a bus system 1222 which may include a power bus, a control signal bus, and a status signal bus in addition to a data bus. However, for the sake of clarity, the various busses are illustrated in FIG. 12 as the bus system 1222.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration. The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for implementing proxy mobile Internet protocol (PMIP) in mobile IP foreign agent care-of-address mode, the method being performed by a network node that acts as a proxy performing mobile IP client functionality in an access terminal, the method comprising:
   determining a home address of the access terminal;
   communicating with a source base station and a local mobility home agent wherein the source base station sends an access request to an authentication, authorization, and accounting (AAA) device, the AA device replies with an access accept message that includes a home address of the access terminal;
   generating and exchanging session keys by the access terminal and source base station;
   sending a dynamic host configuration protocol request from the access terminal to the source base station;

receiving a dynamic host configuration protocol reply from the source base station, wherein the dynamic host configuration reply includes the home address of the access terminal;

obtaining, by the source base station, all foreign agent care of addresses of all access terminals served by the source base station;

creating a binding at the local mobility home agent between at least one access terminal served by the source base station, wherein the binding is between an address of the proxy mobile internet protocol network node and the home address of at the at least one access terminal served by the source base station, and also to establish a tunnel between the proxy mobile IP network node and the local mobility home agent, wherein the local mobility home agent is separate from a home agent in the access terminal's home network;

receiving, at the proxy mobile IP network node, first packets destined for the access terminal from the local mobility home agent via the tunnel and sending the first packets to the access terminal without using any tunnel; and receiving second packets sent by the access terminal that are destined for a correspondent node and sending the second packets to the local mobility home agent via the tunnel.

2. The method of claim 1, wherein determining the home address of the access terminal comprises receiving the home address of the access terminal from a home agent.

3. The method of claim 1, wherein determining the home address of the access terminal comprises snooping a registration reply message that is sent from a home agent.

4. The method of claim 1, wherein determining the home address of the access terminal comprises receiving the home address of the access terminal from the access terminal.

5. The method of claim 1, wherein the PMIP uses a specific generic routing encapsulation (GRE) tunnel.

6. The method of claim 5, wherein the GRE tunnel is used to assign an IPv4 address to the access terminal.

7. The method of claim 5, wherein the GRE tunnel is used to assign an IPv6 address to the access terminal.

8. The method of claim 5, wherein the GRE tunnel is used to assign an MIPv4 address to the access terminal.

9. The method of claim 5, wherein the GRE tunnel is used to assign an MIPv6 address to the access terminal.

10. The method of claim 1, further comprising using a generic routing encapsulation (GRE) key to differentiate access terminals with overlapping IP addresses.

11. A network node for implementing proxy mobile Internet protocol (PMIP) in mobile IP foreign agent care-of-address mode, comprising:
a processor;
memory in electronic communication with the processor;
instructions stored in the memory, the instructions being executable to:
determine a home address of the access terminal;
communicating with a source base station and a local mobility home agent wherein the source base station sends an access request to an authentication, authorization, and accounting (AAA) device, the AA device replies with an access accept message that includes a home address of the access terminal;
generating and exchanging session keys by the access terminal and source base station;
sending a dynamic host configuration protocol request from the access terminal to the source base station;

receiving a dynamic host configuration protocol reply from the source base station, wherein the dynamic host configuration reply includes the home address of the access terminal;

obtaining, by the source base station, all foreign agent care of addresses of all access terminals served by the source base station;

creating a binding at the local mobility home agent between at least one access terminal served by the source base station, wherein the binding is between an address of the proxy mobile internet protocol network node and the home address of at the at least one access terminal served by the source base station, and also to establish a tunnel between the proxy mobile IP network node and the local mobility, home agent, wherein the local mobility home agent is separate from a home agent in the access terminal's home network;

receive, at the proxy mobile IP network node, first packets destined for the access terminal from the home agent via the tunnel and sending the first packets to the access terminal without using any tunnel; and receive second packets sent by the access terminal that are destined for a correspondent node and sending the second packets to the local mobility home agent via the tunnel.

12. The network node of claim 11, wherein determining the home address of the access terminal comprises receiving the home address of the access terminal from a home agent.

13. The network node of claim 11, wherein determining the home address of the access terminal comprises snooping a registration reply message that is sent from a home agent.

14. The network node of claim 11, wherein determining the home address of the access terminal comprises receiving the home address of the access terminal from the access terminal.

15. The network node of claim 11, wherein the PMIP uses a specific generic routing encapsulation (GRE) tunnel.

16. An apparatus for implementing proxy mobile Internet protocol (PMIP) in mobile IP foreign agent care-of-address mode, comprising:
means for determining a home address of the access terminal;
means for communicating with a source base station and a local mobility home agent wherein the source base station sends an access request to an authentication, authorization, and accounting (AAA) device, the AA device replies with an access accept message that includes a home address of the access terminal;
means for generating and exchanging session keys by the access terminal and source base station;
means for sending a dynamic host configuration protocol request from the access terminal to the source base station;
means for receiving a dynamic host configuration protocol reply from the source base station, wherein the dynamic host configuration reply includes the home address of the access terminal;
means for obtaining, by the source base station, all foreign agent care of addresses of all access terminals served by the source base station;
means for creating a binding at the local mobility home agent between at least one access terminal served by the source base station, wherein the binding is between an address of the proxy mobile internet protocol network node and the home address of at the at least one access terminal served by the source base station, and also to establish a tunnel between the proxy mobile IP network node and the local mobility home agent, wherein the local mobility home agent is separate from a home agent in the access terminal's home network;

means for receiving, at the proxy mobile IP network node, first packets destined for the access terminal from the local mobility home agent via the tunnel and sending the first packets to the access terminal without using any tunnel; and means for receiving second packets sent by the access terminal that are destined for a correspondent node and sending the second packets to the local mobility home agent via the tunnel.

17. The apparatus of claim 16, wherein determining the home address of the access terminal comprises receiving the home address of the access terminal from a home agent.

18. The apparatus of claim 16, wherein determining the home address of the access terminal comprises snooping a registration reply message that is sent from a home agent.

19. The apparatus of claim 16, wherein determining the home address of the access terminal comprises receiving the home address of the access terminal from the access terminal.

20. The apparatus of claim 16, wherein the PMIP uses a specific generic routing encapsulation (GRE) tunnel.

21. A computer-program product for implementing proxy mobile Internet protocol (PMIP) in mobile IP foreign agent care-of-address mode, the computer-program product comprising a computer readable medium having instructions thereon, the instructions comprising:

code for determining a home address of the access terminal;

code for communicating with a source base station and a local mobility home agent wherein the source base station sends an access request to an authentication, authorization, and accounting (AAA) device, the AA device replies with an access accept message that includes a home address of the access terminal;

code for generating and exchanging session keys by the access terminal and source base station:

code for sending a dynamic host configuration protocol request from the access terminal to the source base station;

code for receiving a dynamic host configuration protocol reply from the source base station, wherein the dynamic host configuration reply includes the home address of the access terminal;

code for obtaining, by the source base station, all foreign agent care of addresses of all access terminals served by the source base station;

code for creating a binding at the local mobility home agent between at least one access terminal served by the source base station, wherein the binding is between an address of the proxy mobile internet protocol network node and the home address of at the at least one access terminal served by the source base station, and also to establish a tunnel between the proxy mobile IP network node and the local mobility home agent, wherein the local mobility home agent is separate from a home agent in the access terminal's home network;

code for receiving first packets destined for the access terminal from the local mobility home agent via the tunnel and sending the first packets to the access terminal without using any tunnel; and code for receiving second packets sent by the access terminal that are destined for a correspondent node and sending the second packets to the local mobility home agent via the tunnel.

22. The computer-program product of claim 21, wherein determining the home address of the access terminal comprises receiving the home address of the access terminal from a home agent.

23. The computer-program product of claim 21, wherein determining the home address of the access terminal comprises snooping a registration reply message that is sent from a home agent.

24. The computer-program product of claim 21, wherein determining the home address of the access terminal comprises receiving the home address of the access terminal from the access terminal.

25. The computer-program product of claim 21, wherein the PMIP uses a specific generic routing encapsulation (GRE) tunnel.

\* \* \* \* \*